(12) United States Patent
Lin et al.

(10) Patent No.: US 10,915,302 B2
(45) Date of Patent: Feb. 9, 2021

(54) IDENTIFICATION AND VISUALIZATION OF ASSOCIATIONS AMONG CODE GENERATED FROM A MODEL AND SOURCES THAT AFFECT CODE GENERATION

(71) Applicant: The MathWorks, Inc., Natick, MA (US)

(72) Inventors: Xiaocang Lin, Wayland, MA (US); Wuwei Liang, Hopkinton, MA (US); Sherman Braganza, Brookline, MA (US); Wei Wang, Holliston, MA (US); Yong Huang, Sudbury, MA (US); Michael Iannicelli, Brookline, MA (US)

(73) Assignee: The MathWorks, Inc., Natick, MA (US)

( * ) Notice: Subject to any disclaimer, the term of this patent is extended or adjusted under 35 U.S.C. 154(b) by 20 days.

(21) Appl. No.: 16/383,132

(22) Filed: Apr. 12, 2019

(65) Prior Publication Data
US 2020/0183658 A1 Jun. 11, 2020

Related U.S. Application Data

(60) Provisional application No. 62/778,101, filed on Dec. 11, 2018.

(51) Int. Cl.
*G06F 9/44* (2018.01)
*G06F 8/35* (2018.01)

(52) U.S. Cl.
CPC .................................... *G06F 8/35* (2013.01)

(58) Field of Classification Search
None
See application file for complete search history.

(56) References Cited

U.S. PATENT DOCUMENTS

| 8,661,344 B1 * | 2/2014 | Torgerson | G06F 9/451 715/710 |
| 8,667,407 B1 * | 3/2014 | Szpak | G06F 8/10 715/764 |
| 8,839,187 B1 * | 9/2014 | Yan | G06F 8/423 717/104 |

(Continued)

*Primary Examiner* — Insun Kang
(74) *Attorney, Agent, or Firm* — Kacvinsky Daisak Bluni PLLC

(57) ABSTRACT

A system determines what aspects of input sources contribute to code generation and provides associations between the input sources and components of features of the generated code. These associations may be visualized by displaying visual cues of the associations. The input sources may be of different types, including but not limited to a model, a code generator and values for atomic configuration setting for code generation. The visual cue that is displayed may take the form of a visible connection between the input sources and the relative portion or portions of the generated programming code. Suggestions may be generated in response to edits to the generated programming code as to how the sources may be modified to provide desired changes in the generated programming code. Analysis may be performed to identify artifacts in the generated programming code and associations to the sources may be identified to specify what source contributed to portions of the generated programming code.

33 Claims, 36 Drawing Sheets

(56) References Cited

U.S. PATENT DOCUMENTS

| | | | |
|---|---|---|---|
| 9,280,324 B1* | 3/2016 | Lin | G06F 8/10 |
| 10,581,675 B1* | 3/2020 | Iyer | G06F 8/71 |
| 2006/0048097 A1* | 3/2006 | Doshi | G06F 9/44526 |
| | | | 717/120 |
| 2008/0028371 A1* | 1/2008 | Brothers | G06F 11/0775 |
| | | | 717/136 |
| 2009/0327994 A1* | 12/2009 | Christensen | G06F 8/71 |
| | | | 717/106 |
| 2010/0293533 A1* | 11/2010 | Andrade | G06F 8/71 |
| | | | 717/140 |
| 2011/0289477 A1* | 11/2011 | Marvin | G06F 9/541 |
| | | | 717/108 |
| 2012/0124552 A1* | 5/2012 | Lin | G06F 40/151 |
| | | | 717/107 |
| 2012/0159423 A1* | 6/2012 | Becker | G06F 9/44526 |
| | | | 717/102 |
| 2013/0024837 A1* | 1/2013 | Bienkowski | G06F 11/3664 |
| | | | 717/109 |
| 2013/0024844 A1* | 1/2013 | Bienkowski | G06F 11/3624 |
| | | | 717/125 |
| 2013/0079896 A1* | 3/2013 | Harjunkoski | G06F 8/34 |
| | | | 700/9 |
| 2013/0117733 A1* | 5/2013 | Ahmed | G06F 8/30 |
| | | | 717/140 |
| 2013/0145347 A1* | 6/2013 | Karr | G06F 11/3604 |
| | | | 717/113 |
| 2013/0227573 A1* | 8/2013 | Morsi | G06F 9/5083 |
| | | | 718/100 |
| 2014/0059513 A1* | 2/2014 | Sabo | G06F 8/70 |
| | | | 717/101 |
| 2014/0181797 A1* | 6/2014 | Beretta | G06F 8/41 |
| | | | 717/140 |
| 2015/0067653 A1* | 3/2015 | Guarnieri | G06F 8/30 |
| | | | 717/126 |
| 2015/0160932 A1* | 6/2015 | Branson | G06F 8/443 |
| | | | 717/151 |
| 2015/0161289 A1* | 6/2015 | Branson | G06F 16/9024 |
| | | | 707/755 |
| 2017/0046134 A1* | 2/2017 | Straub | G06F 8/31 |
| 2017/0109210 A1* | 4/2017 | Goossens | G06F 8/44 |
| 2018/0121176 A1* | 5/2018 | Cook | G06F 8/41 |
| 2018/0253340 A1* | 9/2018 | Barsness | G06F 8/433 |
| 2019/0235848 A1* | 8/2019 | Swiecki | G06F 8/71 |
| 2020/0004849 A1* | 1/2020 | Baker | G06F 9/44505 |
| 2020/0026711 A1* | 1/2020 | Blom | G06F 16/9024 |

* cited by examiner

```
/*
 * Exported Global als with an exported global
 * Note: Error will declare the memory for
 * storage cla
 * these signa
 */
79  extern real_T In1;    /* '<Root>/In1' */
80  extern real_T In2;    /* '<Root>/In2' */
81  extern real_T In3;    /* '<Root>/In3' */
82  extern real_T In4;    /* '<Root>/In4' */
```

Definition
Variable defined in rtwdemo_comments.o
35 real_T In1;
Model elements
Block: <Root>/In1
Signal: In1
Customization
Individual element mapping
◇ In1: ExportedGlobal

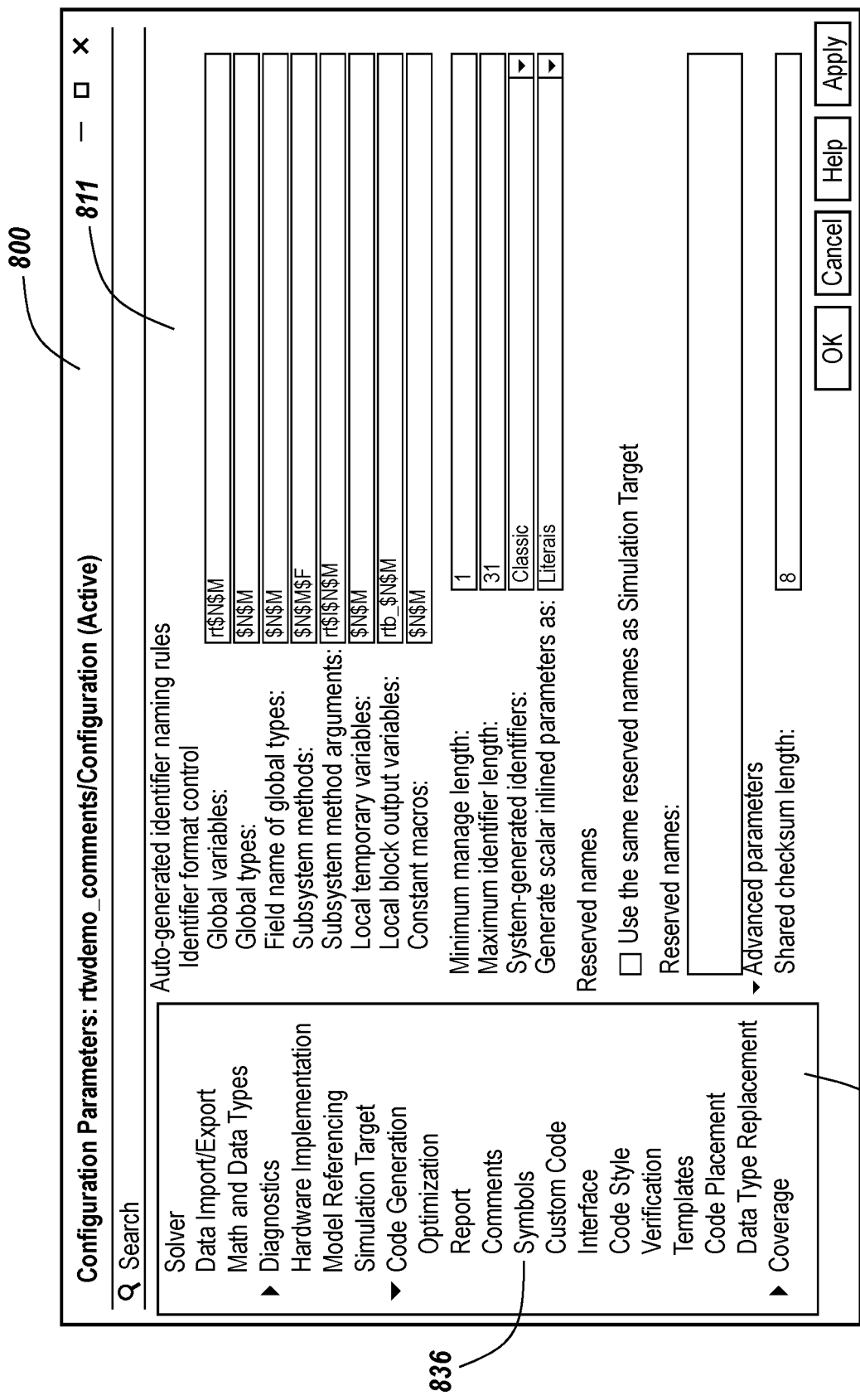
Fig. 8D (Part 1)

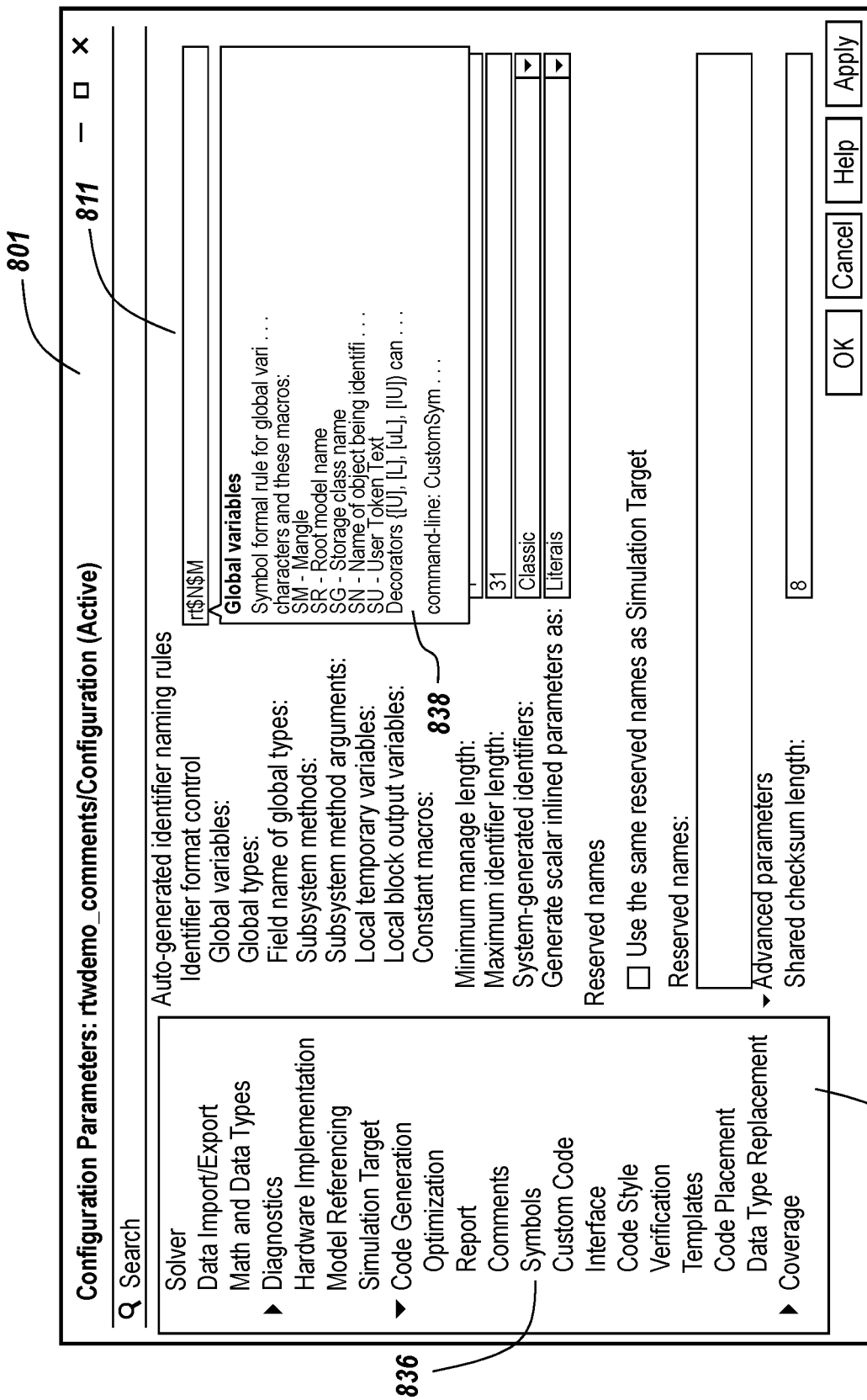
Fig. 8D (Part 2)

Without buffer reuse

```
void rtwdemo_label_guided_reuse_step (void)
(
    real_T rtb_Saturation[4];          ⎫
    real_T rtb_Gain1[4];               ⎬— 1020
    int32_T i;
    AtomicSubsystem(rtU.In1, rtY.Out1);
    for (i = 0; i < 4; i++) (
        if   (rtY.Out1[i] = 10.0) (
            rtb_Saturation[i] = 10.0;
        } else if (rtY.Out1[i] < -10.0) (
            rtb_Saturation[i] = -10.0;
        } else (
            rtb_Saturation[i] = rtY.Out1[i];
        }
        rtb_Gain1[i] = 3.0 * rtY.Out1[i];
    }
    AtomicSubsystem1 (rtb_Saturation, rtb_Gain1, rtY.Out1);
}
```

Code Mappings - C                                                                        ✕

| Entry-Point Functions | Data Defaults | Function Defaults |

◫ ◫                                                                           [ Filter contents ]

| Model Element Category | Storage Class |
|---|---|
| ⊙▸ Inports *1044* | Default |
| ▸⊙ Outports | Default |
| ▤ Global parameters | Default |
| ▤ Local parameters | Default |
| ▤ Parameter arguments | Default |

Code Mappings - C    Model Data Editor

*── 1042*

Model Data Editor                                                                        ✕

| Inports/Outports | Signals | Data Stores | States | Parameters |

[ Code ▾ ]  ◫ ◫                                                      ▤ [ Filter contents ]

| Source | # | Signal Name | Resolve | Storage Class | Header File | Definition File |
|---|---|---|---|---|---|---|
| ⊙▸ In1 | 1 | In1 | ☐ | ExportToFile | foobar.h | |
| ⊙ In2 *1046* | 2 | | ☐ | Auto | | |
| ⊙ In3 | 3 | | ☐ | Auto | | |
| ⊙ In4 | 4 | | ☐ | Auto | | |
| ▸⊙ Out1 | 1 | | ☐ | Auto | | |

Code Mappings - C    Model Data Editor

*Fig. 10C*

Group default mapping

[ rtwdemo_comments.h ▶ ]  🔍Search

```
    /* External inputs (root inport signals with default storage) */
[-]typedef struct {
57    real_T In1;                /* '<Root>/In1' */
58    real_T In2;                /* '<Root>/In2' */
59    real_T In3;                /* '<Root>/In3' */
60    real_T In4;                /* '<Root>/In4' */
    } ExternalInputs;
```

Individual mapping overrides group default mapping

[ rtwdemo_comments.h ▶ ] 🔍Search

```
/* External inputs (root inport signals with default storage) */
[-]typedef struct {
    real_T In1;      /* '<Root>/In1' */
    real_T In2;      /* '<Root>/In2' */
    real_T In3;      /* '<Root>/In3' */
    real_T In4;      /* '<Root>/In4' */
} ExternalInputs;
```
⎫
⎬ 1064
⎭

[ foobar.h ▶ ] 🔍Search

```
/* Exported data declaration */
/* Declaration for custom storage class: ExportToFile */
extern real_T In1;

#endif           /* RTW_HEADER_foobar_h_ */
```
⎫
⎬ 1062
⎭

*Fig. 10E*

IDENTIFICATION AND VISUALIZATION OF ASSOCIATIONS AMONG CODE GENERATED FROM A MODEL AND SOURCES THAT AFFECT CODE GENERATION

RELATED APPLICATIONS

This application claims priority to U.S. Patent Application No. 62/778,101, filed Dec. 11, 2018, entitled "IDENTIFICATION AND VISUALIZATION OF ASSOCIATIONS AMONG CODE GENERATED FROM A MODEL AND SOURCES THAT AFFECT CODE GENERATION". The contents of the aforementioned applications are incorporated herein by reference.

SUMMARY

In accordance with an exemplary embodiment, a method is performed by a processor of a computing device. For this method, programming code is generated for a model and/or one or more configuration values set for the model. The model is executed, or the programming code that simulates behavior of a real world system is executed. Information is recorded about behavioral effects of the model on the programming code. One or more configuration effects of one or more configuration values that effect the programming code are also recorded. At least some of the behavioral effects and the one or more configuration effects are interdependent. For a portion of the programming code, one of the one or more configuration effects and/or behavioral effects are determined to contribute to a feature of the portion of the programming code. This determining includes analyzing the information that has been recorded and deriving from the behavioral effects and the one or more configuration effects an identity of the one or more configuration effects and/or behavioral effects that contributed to the feature of the portion of the programming code. An association between the identified one of the one or more configuration effects and/or behavioral effects that contributed to the feature of the portion of the programming code is stored.

The analyzing performed by the method may identify the one or more configuration effects as contributing to the feature in some instances. In other instances, the analyzing may identify the one or more behavior effects as contributing to the feature. The configuration effects may resolve from one or more of the following configuration values: choice of naming rules for identifiers, choice of storage class, choice of solver type, choice of solver, choice of data to import, choice of data to export, target hardware details, code style parameters, or choice of programming language of the generated programming code.

The identified one or more behavioral effects may be the result of at least one of the following: a choice of an optimization in code generation, an added feature of the code generator, a patch applied to the code generator, an algorithm of the model, a modification to the model to fix an error, or a modification to the model to make the generated programming code compatible with a coding standard.

In some embodiments, the stored association is used to identify which of the one or more configuration values, aspects of the model and/or aspects of the code generator contributed to the feature of the portion of the programming code. A visual cue may be displayed on a display. The visual cue visually distinguishes the identified configuration values, aspects of the model, and/or aspects of the code generator that contributed to the feature of the portion of the programming code. The displaying may be automatically triggered by a programmatic mechanism. Alternatively, the displaying may be in response to a user interface event.

The model may be, for example, a graphical model or a textual model. The configuration values may be atomic configuration values (as described below).

There may be different relationships between configuration values. For instance, at least one of the configuration values may have at least one of the following relationships relative to causing the one or more configuration effects: a logical AND relationship, a logical OR relationship, an override relationship wherein one of the two configuration values overrides the other, or a combination relationship wherein the at least two configuration values each contribute to the one or more configuration effects.

The above described method may be performed by executing computer-executable instructions that are stored on a non-transitory computer-readable storage media.

In exemplary embodiments, a method may be performed by a computing device. The method may include identifying that generated code has been modified to have a modification, wherein the generated code has been generated by a code generator for multiple sources that include a model, such as a graphical model or a textual model, and at least one other type of source that affects code generation by the code generator. A determination is made how the sources may be modified to realize the modification through code generation by the code generator. Information is displayed on the display device relating to how the sources may be modified to realize the modification through code generation by the code generator. Information regarding relationships among sources may be captured and used in determining how the sources may be modified. How the sources may be modified may be displayed in a prioritized order based on a predetermined priority system. The predetermined priority system may be based on at least one of past behavior, a received preference, or a rule. This method may be performed by executing computer-executable instructions that are stored on a non-transitory computer-readable storage medium.

In accordance with another exemplary embodiment, a method is performed by a processor of a computing device. The method entails performing analysis of a portion of generated code that is generated by a code generator for multiple input sources. The multiple input sources may include a graphical model and another input source of a type that is not a graphical model and that affects the generation of the generated code by the code generator. The analysis yields results. A determination is made as to which of the input sources contributed to the results of the analysis. A trace of the results of the analysis to the determined input sources that contributed to the results is displayed on a display device. The analysis may identify one of the following: violations of a coding standard, compiling errors, errors in the programming code, that a portion of the generate code cannot be proven by a code prover, or changes in the generated code relative to previously generated code generated from the graphical model by the code generator. The analysis may be static analysis or dynamic analysis.

BRIEF DESCRIPTION OF THE DRAWINGS

FIG. 3A illustrates an example of a display of an association among a component in generated programming code, and source aspects.

FIGS. 5A and 5B illustrates an exemplary user interface depicting a associations between source components and an artifacts of analysis.

FIG. 8D illustrates an exemplary user interface in which naming rules may be selected and an explanation of the naming rules syntax may be provided.

FIG. 10B depicts an illustrative feature in generated programming code when buffer reuse is not selected in contrast to the feature shown in FIG. 10A.

FIG. 10C depicts an example for an override relationship wherein a storage class is selected that overrides a default storage class.

FIG. 10D depicts an example of generated programming code where a default storage class is selected for inports in a model.

FIG. 10E depicts an example of generated programming code when a storage class is selected for an inport to override the default storage class.

DETAILED DESCRIPTION

Figure 1A:
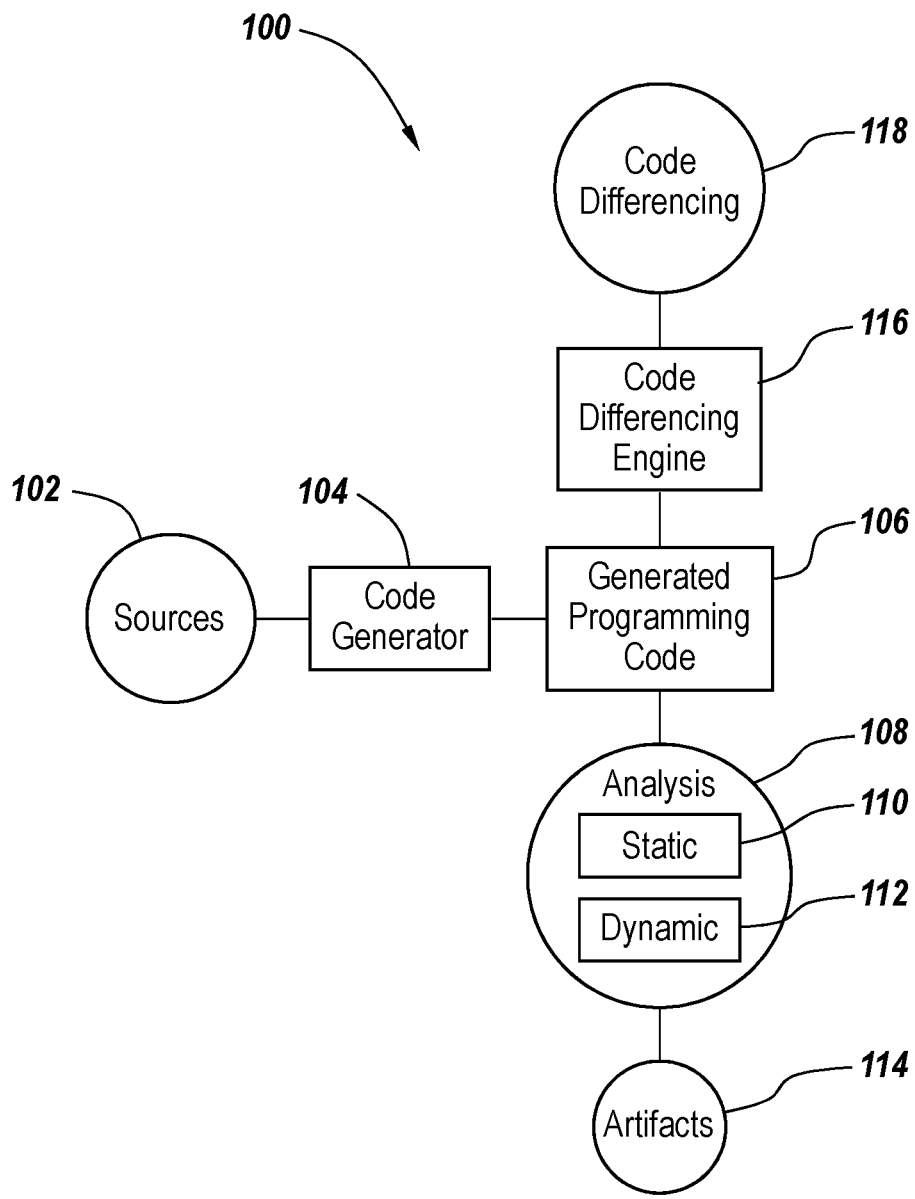
FIG. 1A illustrates components in an exemplary embodiment.

Conventional systems do not provide the ability to identify associations between multiple types of sources and generated programming code that is generated by a code generator from the sources. A source, in this context, refers to something that is modifiable and that influences the programming code that is generated from a model by the code generator. In addition, it is difficult with conventional systems to know how to modify a source or sources to produce a desired change in the generated programming code. The exemplary embodiments described herein may overcome these limitations of conventional systems.

The exemplary embodiments described herein may be able to analyze aspects of the sources that contribute to a feature of the generated programming code. Thus, the exemplary embodiments are not limited to simply mapping between a model and generated programming code. Instead, the exemplary embodiments may be able to identity associations not only to the model, but also to other types of sources that contribute to the resultant features of the generated programming code, such as configuration settings for code generation and versions or modifications to the graphical model and/or code generator. Thus, the exemplary embodiments may identify associations between multiple sources of different types, and the resultant feature(s).

Sources may be categorized by the effects they have on generated programming code. This represents one way of categorizing the sources by type. A source may be the type that affects the observable behavior/results of the generated programming code. This type of source will be referred to herein as "behavioral" herein since this type of source has a "behavioral" effect. Conversely, a source may be of the type that does not affect the observable behavior/results of the generated programming code but rather has non-behavioral effects on the generated programming code (e.g., memory usage of the generated programming code). This type of source will be referred to a "non-behavioral" source. It should be appreciated that some sources have both behavioral effects and non-behavioral effects. In such cases, aspects of the sources may be categorized as behavioral or non-behavioral as appropriate.

The type of a source may identify the variety of the source. For example, different types of sources include a model, and a code generator. In addition, configuration settings, such as choice of naming rules, choice of a storage class constitute another type of source that affect generated programming code. Further, choice of optimizations applied by a code generator constitute a type of source in that they are configuration settings for the code generator.

Systems and/or methods, as described herein, may use a computing environment, such as a technical computing environment (TCE), for performing computing operations. A TCE may include any hardware-based logic or a combination of hardware and software based logic that provides a computing environment that allows tasks to be performed (e.g., by users) related to disciplines, such as, but not limited to, mathematics, science, engineering, medicine, and business. The TCE may include text-based environments (e.g., MATLAB® software), a graphically-based environment (e.g., Simulink® software, Stateflow® software, SimEvents® software, Simscape™ software, etc., by The MathWorks, Incorporated; VisSim by Visual Solutions; LabView® by National Instruments, etc.), or another type of environment, such as a hybrid environment that may include, for example, one or more of the above-referenced text-based environments and one or more of the above-referenced graphically-based environments.

The TCE may be integrated with or operate in conjunction with a graphical modeling environment, which may provide graphical tools for constructing models of systems and/or processes. The TCE may include additional tools, such as tools designed to convert a model into an alternate representation, such as source computer code, compiled computer code, or a hardware description (e.g., a description of a circuit layout). This alternate representation may also include a link to a tag that is associated with a model element of a graphical model. The tag, thus, may enable the TCE to navigate to the model element and/or to one or more hierarchical levels of a model in which the model element exists. Additionally, or alternatively, the tag may enable the TCE to navigate to an element, in the alternative representation, that includes the link to the tag. Additionally, or alternatively, the tag may enable the TCE to navigate to one or more hierarchical levels, of the alternate representation, in which the element exists. In some implementations, the TCE may provide this ability using graphical toolboxes (e.g., toolboxes for signal processing, image processing, color manipulation, data plotting, parallel processing, etc.). In some implementations, the TCE may provide these functions as block sets. In some implementations, the TCE may provide these functions in another way.

Models generated with the TCE may be, for example, models of a physical system, a computing system, an engineered system, an embedded system, a biological system, a chemical system, etc. The models may be based on differential equations, partial differential equations, difference equations, differential and algebraic equations, discrete-event systems, state transition systems, state charts, data-flow systems, etc. In some implementations, models may be hierarchical, and include a number of hierarchical levels. A hierarchical level, of a hierarchical model, may be represented by an entity, such as a subsystem or a subchart. The subsystem or subchart may be associated with a local namespace, where data may be globally accessible within the namespace, but not outside the namespace.

A model generated with the TCE may include, for example, any equations, action language, assignments, constraints, computations, algorithms, functions, methods, and/or process flows. The model may be implemented as, for example, time-based block diagrams (e.g., via the Simulink® product, available from The MathWorks, Incorporated), discrete-event based diagrams (e.g., via the SimEvents® product, available from The MathWorks, Incorporated), dataflow diagrams, state transition diagram (e.g., via the Stateflow® product, available from The MathWorks, Incorporated), software diagrams, a textual array-based and/or dynamically typed language (e.g., via the MATLAB® product, available from The MathWorks, Incorporated), noncausal block diagrams (e.g., via the Simscape™ product, available from The MathWorks, Incorporated), and/or any other type of model.

The TCE may use one or more text-based products, such as textual modeling environments. For example, a text-based modeling environment may be implemented using products such as, but not limited to, MATLAB by The MathWorks, Incorporated; Octave from the Free Software Foundation; MATRIXx from National Instruments; Python, from the Python Software Foundation; Comsol Script, from Comsol Inc.; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence Design Systems, Inc.; or Modelica from the Modelica Association or Dymola from Dassault Systèmes. In some embodiments, the text-based modeling environment may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc.

In some implementations, the text-based modeling environment may include a dynamically typed language that may be used to express problems and/or solutions in mathematical notations familiar to those of skill in the relevant arts. For example, the modeling environment may use an array as a basic element, where the array may not require dimensioning. These arrays may be used to support array programming in that operations can apply to an entire set of values, such as values in an array. Array programming may allow array-based operations to be treated as a high-level programming technique or model that lets a programmer think and operate on entire aggregations of data without having to resort to explicit loops of individual non-array, i.e., scalar operations.

The modeling environment may further be adapted to perform matrix and/or vector formulations that may be used for data analysis, data visualization, application development, simulation, modeling, algorithm development, etc. These matrix and/or vector formulations may be used in many areas, such as statistics, finance, image processing, signal processing, control design, computer aided design (CAD), product life cycle management (PLM), life sciences, education, discrete event analysis and/or design, state based analysis and/or design, etc.

In another example embodiment, the TCE may be implemented in a graphically-based modeling environment using products such as, but not limited to, Simulink®, Stateflow®, SimEvents®, Simscape™, etc., by The MathWorks, Incorporated; VisSim by Visual Solutions; LabView® by National Instruments; Dymola by Dassault Systèmes; Soft-WIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from INRIA; Virtuoso from Cadence; Rational Rose from IBM; Rhapsody or Tau from IBM; Ptolemy from the University of California at Berkeley; or aspects of a Unified Modeling Language (UML) or SysML environment.

The exemplary embodiments enable identification of aspects of sources at an atomic level as well as at non-atomic levels. An atomic source aspect refers to an aspect of the sources that causes an observable and traceable effect in the generated code.

The term "atomic" may be used herein to refer to source aspects, for example, such as configuration settings, model elements, optimization choices, etc. "Atomic" also may be used herein to refer to effects produced by the atomic source aspects during code generation. For example, higher level settings like selection of an optimization level are non-atomic source aspects. Lower level configuration settings that are set in response to the higher level settings may be atomic source aspects.

The exemplary embodiments may enable one to see associations between atomic source aspects and features in the generated programming code. Each feature may have one or more components. Atomic source aspects may be associated with atomic components in the generated programming code. The visualization of each such association may show all such components and associated source aspects. The atomic nature of source aspects and resulting atomic configuration effect(s) evidenced in the components enables one to identify at a fundamental level what in the sources manifest itself via code generation in the relevant features in the generated programming code and vice versa.

The exemplary embodiments may identify and produce a visualization of associations between results of analysis of the generated programming code and source aspects. For example, static analysis such as identifying artifacts, like compiling errors, logic errors, code standard violations and coding proving errors, may be performed. The static analysis may include analysis of code syntax, such as a structural analysis, or analysis of behavior of the code without running the code. The source aspects that result in the artifacts may be identified and the association of the source aspects and the artifacts may be visualized in the exemplary embodiments. Similarly, dynamic analysis (i.e., analysis performed on the generated programming code when the generated programming code is executing), such as code profiling and code coverage analysis, may be performed to produce artifacts. Exemplary embodiments may identify associations between the artifacts and source aspects of the sources and provide a visualization of the associations.

The exemplary embodiments may also provide useful information regarding generated programming code that is generated from a first set of sources with generated programming code that is generated from a second set of sources. In exemplary embodiments, a code differencing engine may identify the differences between the sets of generated programming code and may identify what atomic source aspect(s) in the respective sets of sources is/are responsible for the differences in the sets of generated programming code. For instance, suppose that a first version of a code generator subsequently was used to generate programming code for a graphical model. Suppose further that a second version of the code generator was used to generate code for the source graphical model to produce a second set of generated programming code. A code differencing engine may be applied to the first version of the programming code and the second version of the programming code to identify differences between the generated programming code. A particular one of the differences may be identified as resulting from a particular difference in the versions of the code generator. The association between the difference in the code generators and the difference in the generated programming code may be identified and visualized in exemplary embodiments.

Other differences in the code, such as generated programming code improvements and changes in code made to address bugs or regressions (e.g., decreases in performance of the programming code resulting from changes), may be identified and may be associated back with the changes in atomic source aspect(s) that caused the improvements, bugs or regressions.

The identification of the associations between source aspects and the resulting features in the generated programming code or artifacts may rely upon storage of information in constructs, such as data structures, during the code generation process. In some exemplary embodiments, a code generator may flag effects of source aspects in data structures when the generated programming code is generated. In exemplary embodiments where the sources include a model that from which generated programming code is generated, some exemplary embodiments may employ intermediate representations that are used in code generation. The stored information (as referenced above) may be stored along with such intermediate representations to identify the atomic source aspects and to facilitate the associations of the source aspects to the resulting effects in the generated code. In alternative exemplary embodiments, other information may be stored, such an identification of the association or change information indicating when an aspect of a source changed.

Exemplary embodiments may also provide suggestions as to how to modify the sources, such as the source aspects, to realize an associated effect in the generated programming code. The suggestions may be displayed via a user interface or other mechanism. Each suggestion may include a mechanism that may be activated for implementing the suggestion. The suggestion may be triggered, for example by the user modifying the generated programming code.

Figure 1B:
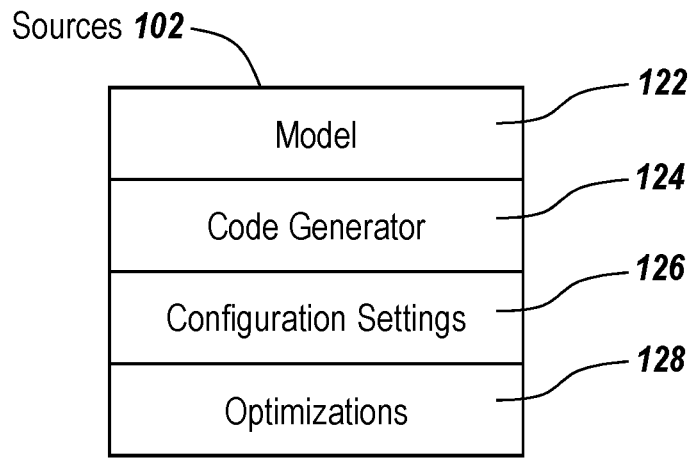
FIG. 1B shows an exemplary list of types of sources.

FIG. 1A shows a depiction 100 of a number of components that may be provided in an exemplary embodiment. As shown in FIG. 1A, a number of different types of sources 102 may act as inputs to a code generator 104 to produce generated programming code 106. As shown in FIG. 1B, the sources 102 may include a model 122, such as a textual model or a graphical model for example. The sources may also include the code generator 104. Algorithms in the code generator 104 and changes made to the code generator 104 may affect the generated programming code. Sources may also include configuration settings 126. As will be described in more detail below, values of a number of atomic configuration settings that relate to the model 122 and code generation may affect the generated programming code 106. The sources 102 may also include optimizations 128 that are performed by the code generator 104. The code generator 104 may provide the option of optimizing the generated programming code 106 in various forms. For example, the generated code may be optimized to reduce memory usage or to be executed more quickly on a processor with limited processing power. This list of sources 102 is not intended to be exhaustive but rather is intended to be illustrative.

Figure 1C:
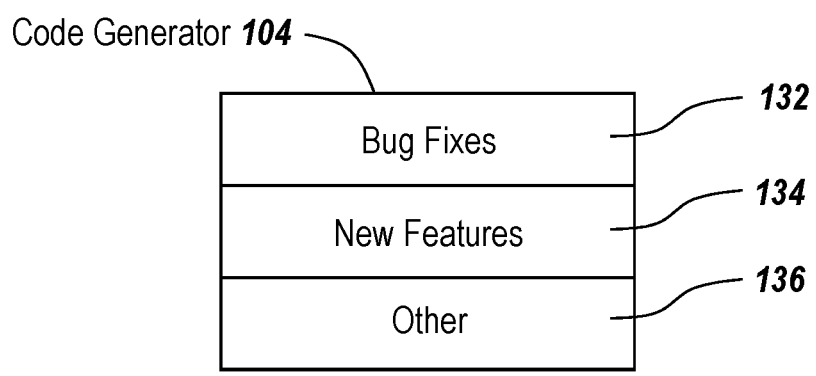
FIG. 1C shows an exemplary list of aspects of a code generator that may change and may affect code generation.

As was mentioned above, the code generator 104 may act as a source 102 that has an effect on the generated programming code 106. FIG. 1C depicts an example of some illustrative aspects of the code generator 104 that may affect the generated programming code 106. Bug fixes 132 may be applied to the code generator 104 to correct errors that previously existed in the code generator 104. These bug fixes 132 may have a resulting effect on the generated programming code 106. New features 134 that are added to the code generator 104 may also affect the generated programming code 106. Often, new releases of a code generator 104 include such new features 134. Other aspects 136 of the code generator 104 may affect the generated programming code 106, such as choice of code generation algorithms and the like.

Figure 1D:
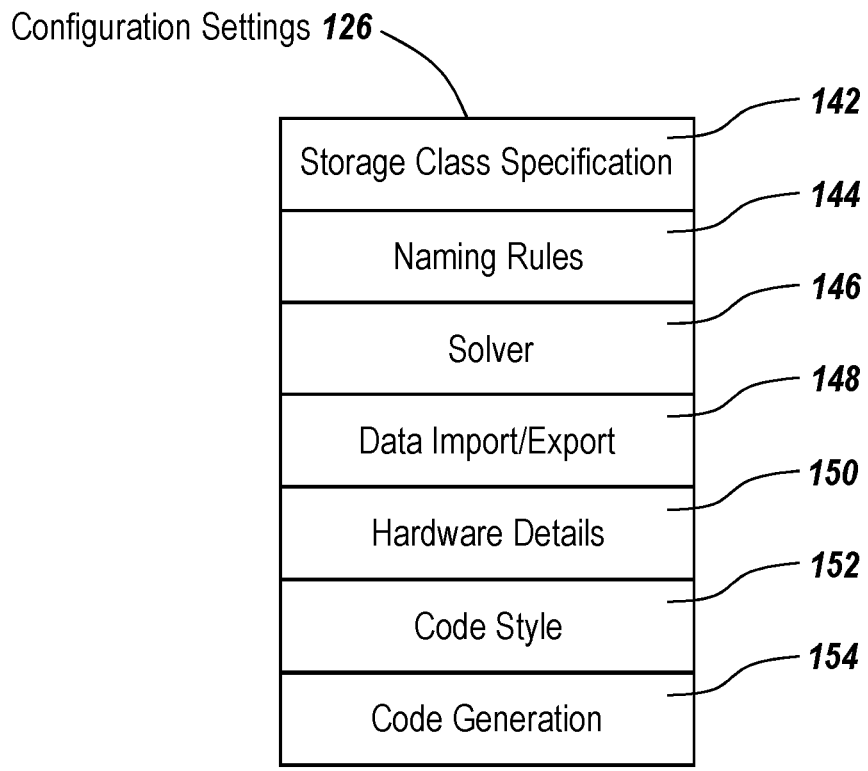
FIG. 1D shows an exemplary list of types of configuration settings.

As mentioned above, values of configuration settings 126 may influence the generated programming code 106. These configuration settings may be atomic or non-atomic. FIG. 1D shows an illustrative list of exemplary categories of configuration settings 126 that may affect the generated programming code 106. Amongst these categories of configurations settings 126 may be a storage class specification 142. Each storage class may specify features of a variable and/or function. The features may include, for instance, scope, visibility, lifetime, data type, and memory section. For example, a "ConstVolatile" storage class specifies memory section for data elements by adding type qualifiers "const" and "volatile" before data declarations:

Declaration: exported through file:*INSTANCE_SPECIFIC_HEADER*
  /* ConstVolatile memory section */
  /* CSC declaration comment generated by default */
  extern const volatile *DATATYPE DATANAME[DIMENSION]*;
Definition:
  /* ConstVolatile memory section */
  /* CSC definition comment generated by default */
  const volatile *DATATYPE DATANAME[DIMENSION]* [= { . . . }];

As a further example, a "BitField" storage class tells the code generator to generate a struct type with bit field information so that compiler can generate memory efficient code.

```
typedef struct INSTANCE_SPECIFIC_STRUCTNAME_tag {
   unsigned int x : 2;
   unsigned int y : 2;
   unsigned int z : 2;
} INSTANCE_SPECIFIC_STRUCTNAME_type;
```

The following table shows more example storage classes.

| Storage Class Name | Description |
|---|---|
| ExportedGlobal | Generate a global variable definition and declaration. The name of the variable is the name of the data element. |
| ImportedExtern | Generate code that reads from and writes to a global variable defined by your external code. |
| ImportedExternPointer | Generate code that reads from and writes to a global pointer variable defined by your external code. Use this storage class when external code defines a data element and provides a pointer for accessing that data. |
| CompilerFlag | Supports preprocessor conditionals defined via compiler flag or option. |
| Const | Generate a global variable definition and declaration with the const type qualifier. |
| ConstVolatile | Generate a global variable definition and declaration with the const and volatile type qualifiers. |
| Define | Generate a macro (#define directive) such as #define myParam 5. |
| ExportToFile | Generate a global variable definition and declaration. One can specify the names of the files that define and declare the variable. |
| FileScope | Generate a global variable definition and declaration with the static type qualifier. In the generated code, the scope of the variable is limited to the current file. |
| GetSet | Generate code that interacts with data by calling your custom accessor functions. External code defines the data and provides the function definitions. |
| ImportedDefine | Generate code that uses a macro (#define directive) defined in a header file in external code. |
| ImportFromFile | Generate code that reads from and writes to a global variable defined by your external code. Similar to ExportToFile, but the generated code does not define the variable. |
| Reusable | Generate more efficient code that stores intermediate calculations of a data path in a single, reused global variable. |
| Struct | Generate a global structure whose name you can specify. |
| Volatile | Generate a global variable definition and declaration with the volatile type qualifier. |
| Localizable | For signals, if possible, generate variables that are local to functions rather than in global storage. Generating local variables prevents the code generator from implementing optimizations that remove the variables from the generated code. |

The configuration settings 126 may also include the specification of naming rules 144 for identifiers in the generated programming code 106. These naming rules 144 specify the conventions that are applied to names of identifiers that appear in the generated programming code 106. The configuration settings 126 may include settings related to solvers and parameters of the solvers 146 that may influence the generated programming code 106. The configuration settings 124 may include data import/export settings 148 that influence the generated programming code 106. Such data import/export settings, for example, may specify whether data is imported, where data is imported from, whether data is exported, and where data is exported to. The configuration settings 126 may include settings related to hardware details 150. Such hardware details may identify particulars of the target device in which the generated programming code 106 is intended to execute. The configuration settings 126 may include settings related to code style 152. For example, the code style settings 152 may affect the syntax and/or structure of the generated programming code. For example, casting configuration settings may be selected to determine whether all types for identities are made explicit, made implicit, or if only some of the types are made explicit in the generated programming code 106. The atomic configuration settings 126 may include settings related to code generation 154. For example, the code generation settings 154 may specify the programming language in which generated programming code is generated.

Figure 1E:
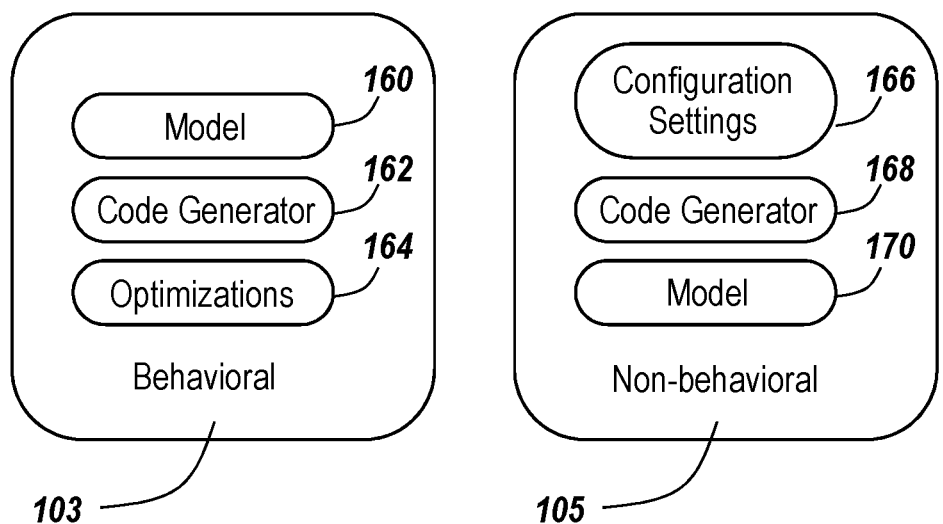
FIG. 1E shows an example of source aspects that are categorized as behavioral or non-behavioral.

FIG. 1E shows that the source aspects 102 may be grouped into a category of behavioral sources 103 and non-behavioral sources 105 as was discussed above. In the depiction in FIG. 1E, some source aspects of the model 160 and the code generator 162 may be grouped as behavioral sources 103. Also in the behavioral sources 103 may be optimizations 164. The sources may also include source aspects that may be categorized as non-behavioral 105. In the example shown in FIG. 1E, non-behavioral source aspect(s) may include various configuration settings 166, aspects of the code generator 168 and aspects of the model 170.

It should be appreciated that the categorization shown in FIG. 1E is not intended to be limiting but rather is intended to be merely illustrative. For instance, there may be other aspects of optimizations that have non-behavioral effects, and there may be aspects of the configuration settings 150 that have behavioral effects.

Returning to FIG. 1A, the exemplary embodiments may include programming functionality for performing analysis 108. As mentioned above, the analysis may be static analysis 110 or dynamic analysis 112. Examples of static analysis 110, include identification of compiling errors, identification of logic errors, identification of bugs, and identification of coding standard violations. Thus, there may be static analysis of code structure and static analysis of runtime behavior. Examples of dynamic analysis 112 include, code profiling and code coverage analysis.

The results of applying the analysis 108 are artifacts 114. For instance, the application of the coding standard violations analysis may produce a list of coding standard violations. Each of these violations may constitute an artifact. For example, a coding violation may refer to a forbidden operator that is used in generated programming code. The exemplary embodiments provide the ability to identify and associate such artifacts with source aspects. This enables the pin-pointing of the cause of the artifacts. Thus, the cause of an artifact may be modified so that the artifact no longer exists.

As shown in FIG. 1A, exemplary embodiments may include a code differencing engine 116. The code differencing engine 116 may identify differences 118 in sets of generated programming code 106. In exemplary embodiments, these code differences 118 may be identified and the causes (i.e., source aspects) in the sources 102 of the code differences 118 may be identified to associate the source aspects with respective code differences 118. The association may be visualized on a display by providing visual cues of the associations. Examples of code differences 118 that may be useful to know and useful to associate with the aspects of the sources 102 may include, for example, code differences resulting from different versions of models or different versions of code generator 104 in the sources 102, code improvements, code errors, code bugs, or code regressions.

By identifying the code differences and identifying the associations between aspects of the sources and corresponding components in the generated programming code that were generated from the changed sources, the exemplary embodiments facilitate identifying causes of the code differences in the generated programming code for the original sources and the modified sources. The identification of the causes may, in turn, enable the remediation of any errors or diminished performance.

It should be appreciated that there need not be a sole cause for code differences or the artifacts of analysis. Instead, there may be multiple causes and these causes may be interdependent such that together the multiple causes result in the code difference or artifact of analysis. As will be explained in more detail below, the exemplary embodiments have the ability to record the causes (e.g., atomic source aspect(s)) and to determine the interdependency of the causes. Moreover, the exemplary embodiments have the ability to visualize these causes.

Figure 2A:
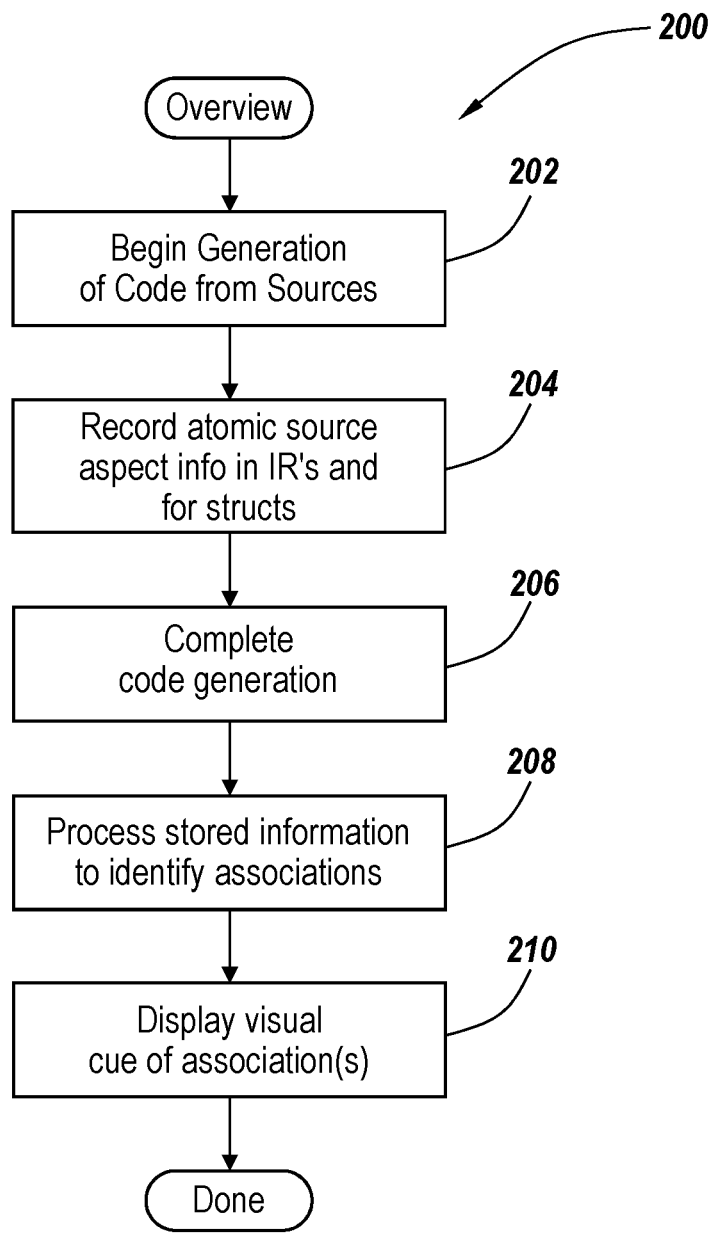
FIG. 2A is a flowchart that provides a high level overview of steps performed in an exemplary embodiment.
Figure 2B:
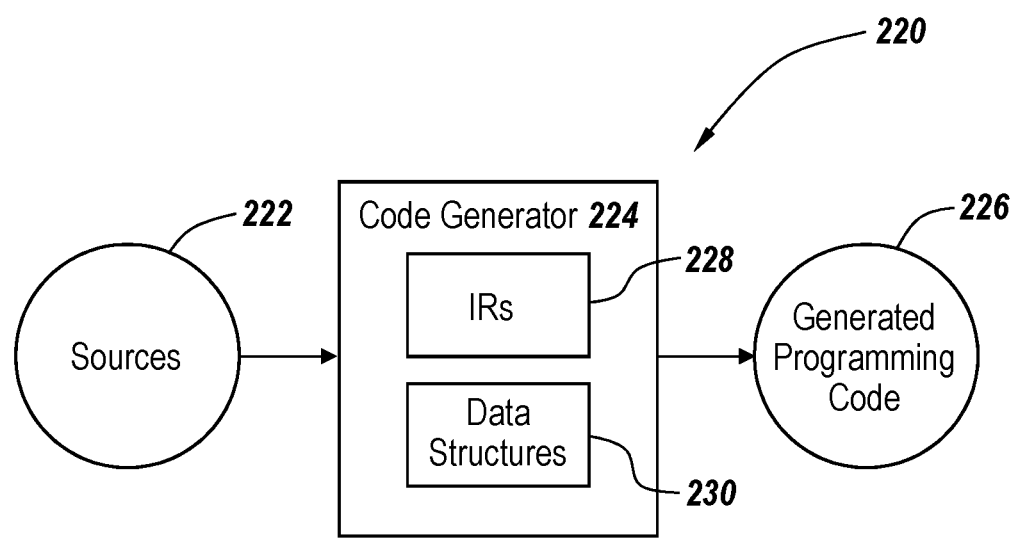
FIG. 2B illustrates sources, a code generator and generated programming code.

FIG. 2A provides a flowchart 200 of steps that may be performed in an exemplary embodiment. This flowchart 200 will be described in conjunction with the diagram 220 of components shown in FIG. 2B. Initially, in step 202 the generation of code from sources 222 may begin. As has been mentioned above, the sources 222 may include, for example, a model, a code generator, configuration settings for code generation and choices of optimizations. In step 204, source aspect information is stored in intermediate representations 228 and/or data structures 230, such as records, tables, or other types of data structures.

In step 206 of FIG. 2A, the code generation process is completed, resulting in the generated programming code 226. Subsequent to the code generation process being completed (step 206), the stored information is processed to identify associations (step 208). The associations are between source aspects and the components of features in the generated programming code 226 that are affected by the source aspects of the sources 222. This processing may be performed on demand, when a request is made to identify such associations. In alternative embodiments, some or all of the associations may be processed before a request is made and the association information preserved for use when needed.

A visual cue of the associations may be displayed on a display device in step 210 of FIG. 2A. The form of the visual cues may vary. Some examples of such visual cues are detailed below. The display of the visual cues may be triggered by actions, such as selection of a piece of the generated programming code, hovering over generated programming code or the like.

Figure 2C:
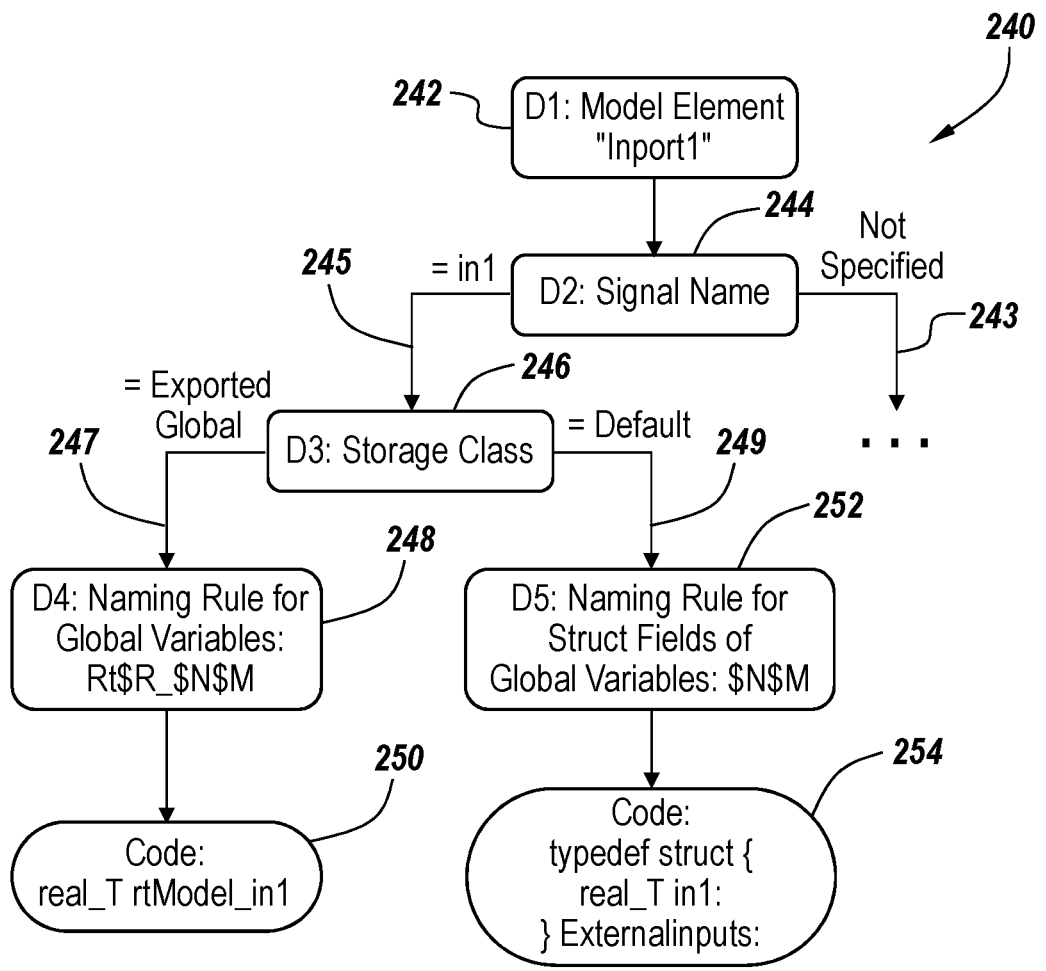
FIG. 2C illustrates an example of a tree of information that may be stored for sources during code generation.

FIG. 2C shows an example of the information that may be stored in an exemplary embodiment for a model element and a variable associated with the model element that is in the generated programming code. In this instance, the information is included in a tree diagram 240. The model element in question is an inport (e.g., an input port) that is labeled as "Inport1."

The tree diagram 240 in FIG. 2C records information relating to decisions made during the code generation process. In particular, for the examples shown in FIG. 2C, the tree diagram records information that is stored at different decision points during the code generation process to determine the name of a block output signal variable in the generated programming code from the inport. The subtree 240 depicted in FIG. 2 begins at the decision point to determine the name of the output signal variable for the model block Inport1. A node 242 is stored and created for the model element. At the next decision point, the code generator checks whether a signal name is specified for the output signal as indicated by node 244. In a first case, the signal name is specified as "In1," as indicated by branch 245 in FIG. 2C. The specified signal name "In1" is used as the base for the variable name. In another case, the signal name is not specified as seen by branch 243.

The code generator then checks at the next decision point (reflected in node 246) whether a storage class is specified for the In1 signal. If the storage class is specified as "Exported Global" as shown in the left branch 247, the code generator then determines that the variable should be standalone global variable. As such, the system uses the naming rules specified in node 248, which results in the final variable name reflected in node 250.

If at the decision point associated with step 246, it is determined that the storage class is "default" as shown by branch 249, the code generator determines that the variable should be a field of a global variable of a structure type and applies to the naming rule for such fields of global variables as indicated by node 252. This results in the variable final structure field name "In1" inside a global variable of structure type.

This recorded information may be processed during and after code generations. The code generator can determine what source aspects are responsible for what component(s) of the generated programming code. For the example associated with FIG. 2C, the stored tree of information may be used to determine the following:

1. The storage class is "Exported Global" for the input signal and thus it is generated as standalone global.
2. The variable name is controlled by naming rule for standalone global variables:
   a. The "rt" part comes from the literal letters in naming rule "rt$R_$N$M."
   b. The "Model" part in the variable name is because of the "$R" specified in the naming rule.
   c. A signal name "In1" exists and it forms the last part of the variable name because "$N" is specified in the naming rule.

With such information, the code generator can determine what source aspects are associated with the components of a feature of the generated programming code as well as provide suggestions on what changes can be made to achieve the desired effects if a user modifies the variable name in the generated code.

It should be appreciated that the depiction in FIG. 2C is only for a very small portion of the underlying model. Information may be stored for all of the model during the code generation. Moreover, information, such as the configuration settings and the like may be stored to identify the configuration effects that choices in the sources have on the generated programming code. Information regarding optimizations and aspect of the code generator may also be stored in such a fashion.

Figure 2D:
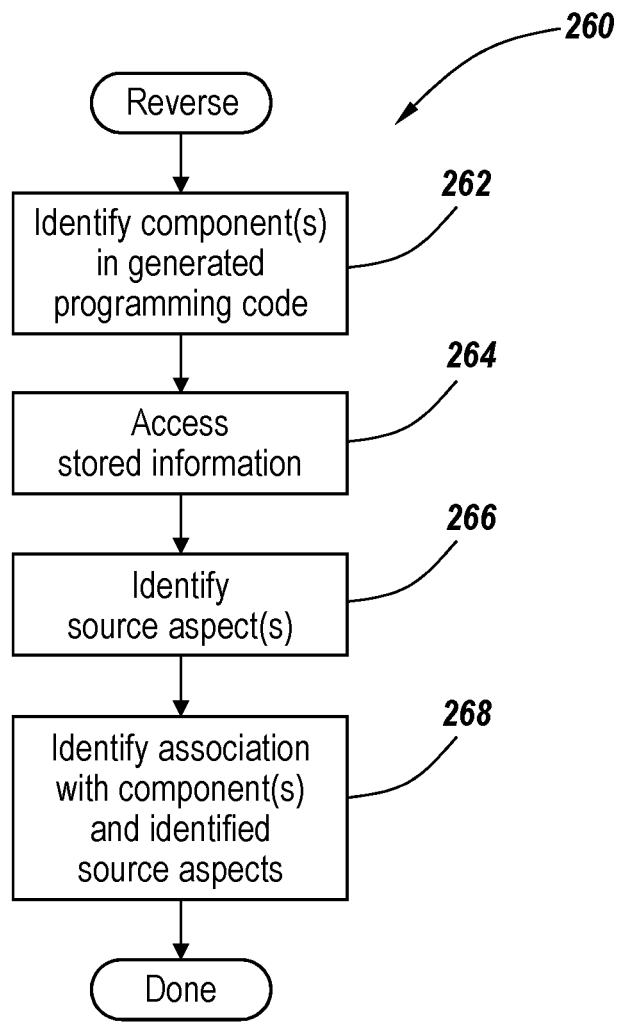
FIG. 2D is a flowchart of steps performed in an exemplary embodiment to create a reverse association between source aspect(s) and component(s) of generated programming code.

The exemplary embodiments identify and visualize associations from the component(s) of the generated programming code to the source aspects. FIG. 2D shows a flowchart 260 that depicts an example of steps that may be performed to realize the "reverse" operations of identifying component(s) of a feature in the generated programming code and the source aspects. In step 262, component(s) of a feature in the generated programming code that are of interest are identified. This may be realized by a user or other party positioning the cursor to hover over the component(s), by selection of the component(s) via an input device, or by other mechanisms. The stored information, like that shown in FIG. 2C, is then accessed in step 264. This information is accessed to identify the source aspect(s) that may be associated with the identified component(s) of the feature (step 266). For instance, if one is interested in knowing where the code 250 shown in FIG. 2C originated from in the sources, the process may walk the tree shown in FIG. 2C beginning at the leaf levels to note that the code originates from the choice of storage class, the naming rules and the model specifying the signal name as well as the model element of the inport.

Based upon identifying the source aspect(s) in step 266, associations may be identified in step 268. These associations may be reflected in the visual cues that may be displayed as mentioned in step 210 of FIG. 2A.

Figure 2E:
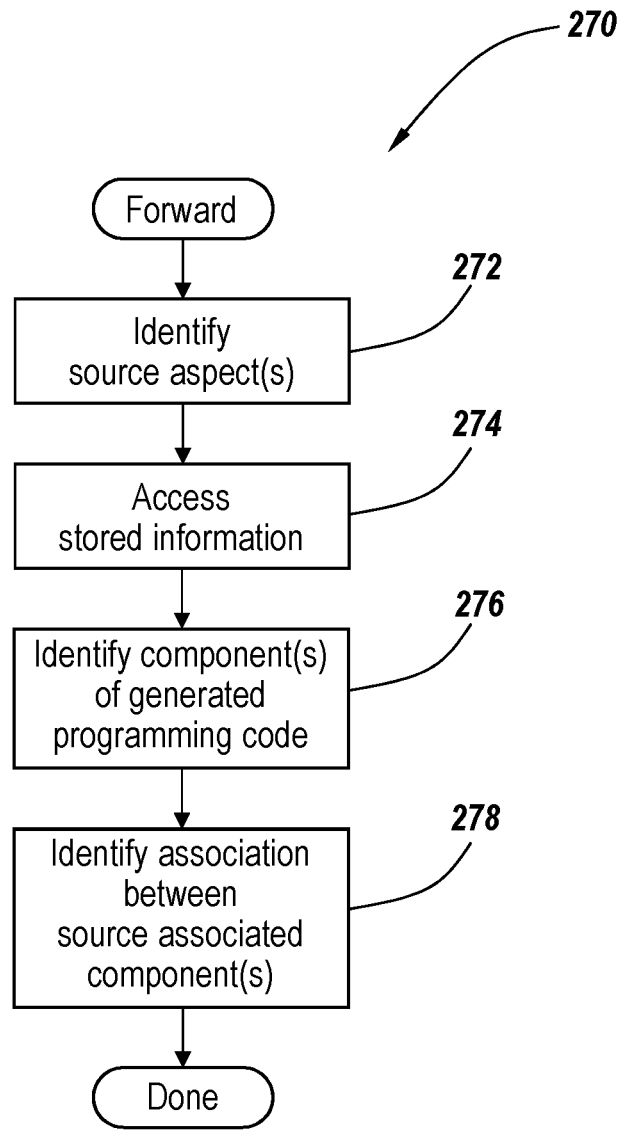
FIG. 2E is a flowchart of steps performed in an exemplary embodiment to create a forward association between component(s) of generated programming code and source aspect(s).

FIG. 2E shows a flowchart 270 of the forward process that may be performed to identify and associate source aspect(s) with component(s) in the generated programming code in exemplary embodiments. This process is largely an inverse of the reverse process of FIG. 2D. In particular, the process begins with step 272 in which one or more source aspects are identified, like the model element 242, signal name In1 245, storage class Exported Global 246 and naming rule 248 (FIG. 2C). This may involve a user selecting or hovering over various source aspects, displayed on a user interface. In step 274, the stored information, like that depicted in FIG. 2C, is accessed. Based on the stored information, component(s) in the generated programming code are identified, like the variable name at declaration 302 (FIG. 3A) in step 276. Associations between the source aspect(s) and the identified component(s) are identified in step 278. In identifying component(s), the system may use the information in FIG. 2C to walk downward in the tree from the identified source aspect(s) until the appropriate leaf reflecting the code at issue is reached. These associations may be visualized by displaying visual cues of the associations as has been discussed above.

The user interface components for displaying the associations may take many different forms. FIG. 3A shows an example that corresponds with the information stored in FIG. 2C. As can be seen, the generated programming code includes a code line 79, which defines the type of In1 302. A user interface element 304, such as a popup tool tip, may be displayed in response to an event, such as when the user selects the line 79 or hovers over the line 79, for example. The popup 304 may include a definition section 306 that identifies where the variable is defined in the underlying code for the model (i.e., one of the source aspects). The popup 304 may also include a model element section 308 that identifies the model elements 310 (for Inport1) and 312 (for the signal output by Inport1). These elements 310 and 312 are additional source aspects associated with line 79 in the generated programming code. The popup 304 includes a customization section 314. The customization section 314 identifies in field 318 how the signal In1 was customized by declaring In1 to be of the Exported Global storage class rather than of a default storage class. This section 318 identifies this additional associated source aspect.

Figure 3B:
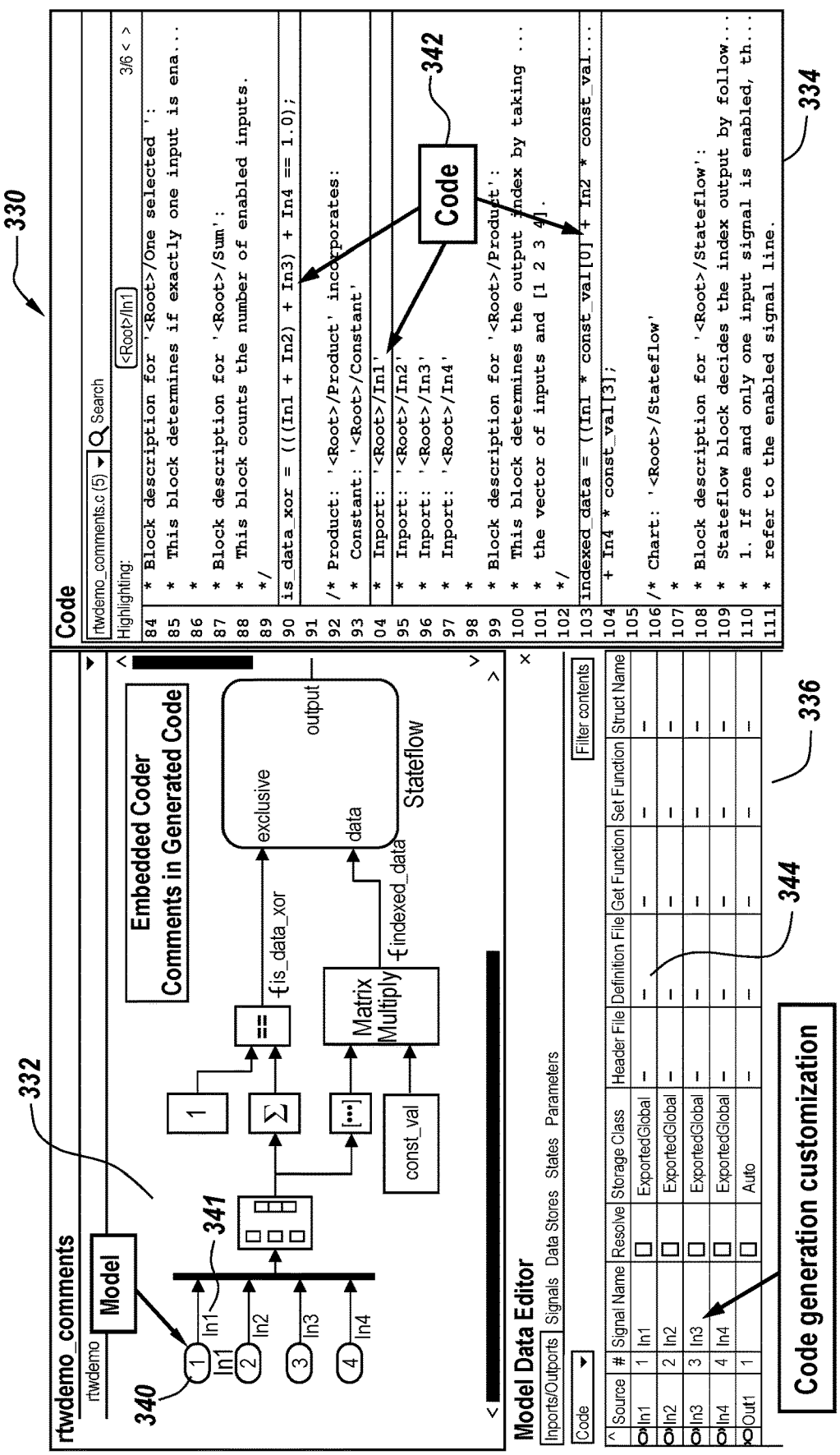
FIG. 3B illustrates an example of a display of an association to source aspects and components of generated programming code.

FIG. 3B shows a different example of a set of user interface components to illustrate associations, like those disclosed above. In the example shown in FIG. 3B, a window 332 displays a model in a simulation environment. The model includes the inport 340. The inport 340 outputs signal In1 341. A model data editor window 336 shows a specification on the signal name is of the Exported Global storage class (see 344). This model data editor window 336 may be used to establish or edit this storage class of the signal In1. A third window 334 is shown that lists the generated programming code. The generated programming code includes highlighted lines of code 342. The highlighted lines of code 342 are the components associated with the highlighted source aspects in windows 332 and 336. As can be seen in window 332, the inport 340 is highlighted as is the signal name 341 In1. In addition, the line 344 in window 336 is highlighted to provide a visual cue of the atomic source aspect of In1 being assigned storage class Exported Global.

As was mentioned above, analysis may be performed on the generated programming code to identify various artifacts of the analysis that are of interest. As was also mentioned above, the exemplary embodiments may identify and associate the artifacts with the source aspects that caused the artifacts.

Figure 4A:
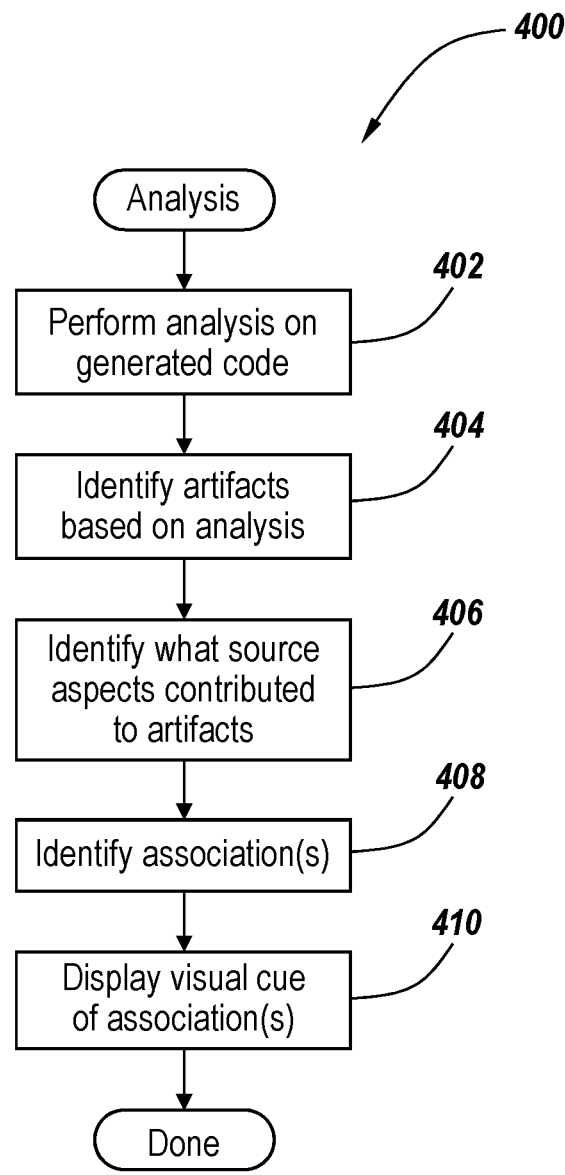
FIG. 4A is a flowchart illustrating the steps performed with analysis in an exemplary embodiment.

FIG. 4A provides a flowchart 400 of the steps that may be performed relating to such analysis. Initially, in step 402, analysis is performed on the generated programming code. This analysis may take many different forms, such as the identification of compiling errors, coding standard violations, logic errors, or bugs. The analysis may be performed by programs, libraries, or other tools having the desired analytical functionality. Based on the analysis, artifacts are identified (step 404). A determination is made of what source aspects contributed to the artifacts (steps 406). Based on the stored information discussed above relative to FIG. 2C, the system knows the association between components of the generated programming code and source aspects. The system knows the association between the artifacts and the components of the generated programming code. Hence, the system may determine the associations between source aspects and the artifacts. The resulting associations based on the determination is established between the source aspects and artifacts (step 408). When prompted or based upon selected commands, the visual cue of the associations may be displayed on the user interface (step 410).

Figure 4B:
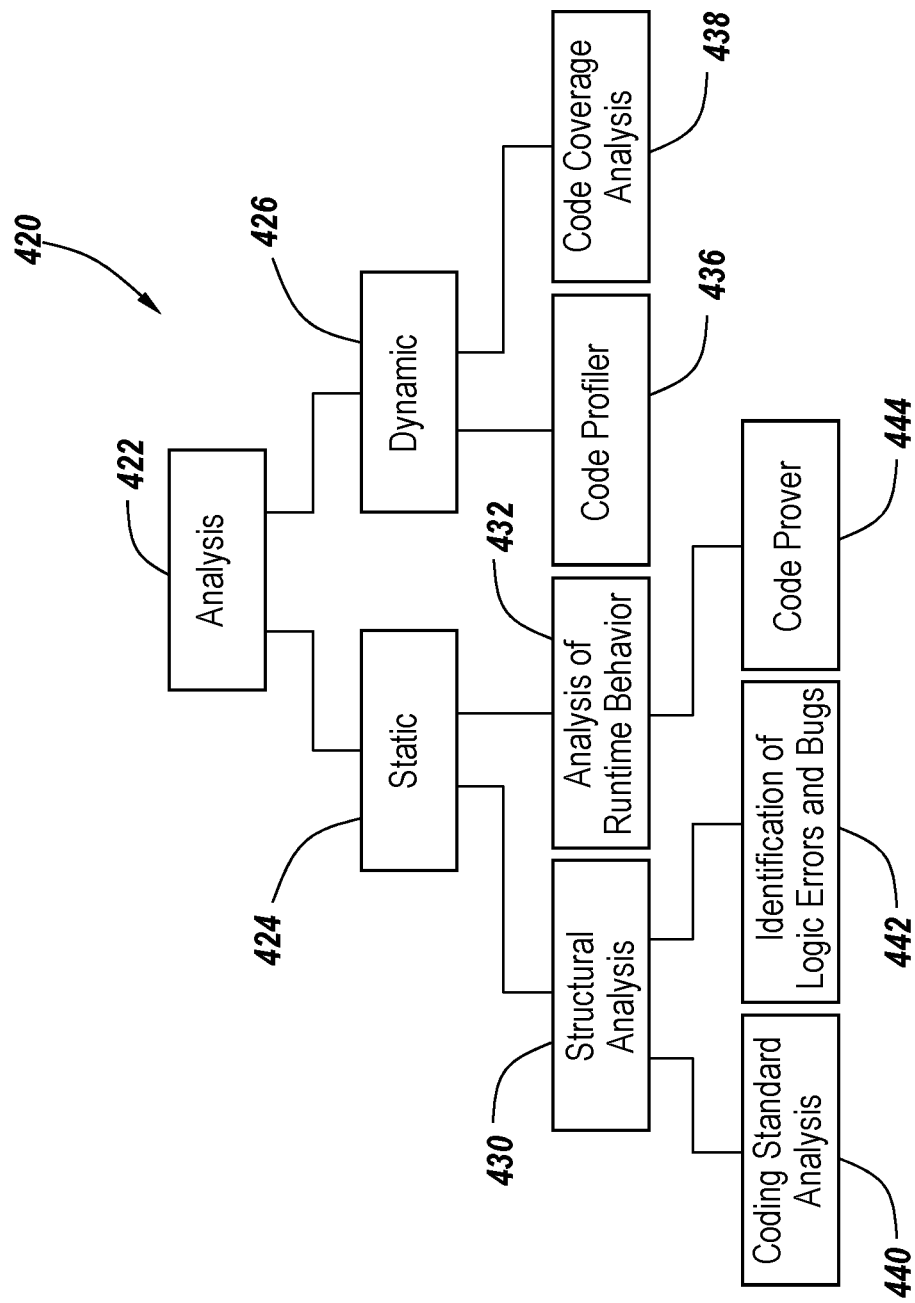
FIG. 4B illustrates exemplary types of analysis.

The types of analysis may vary. FIG. 4B shows an example of some of the types of analysis that may be applied to the generated programming code and that may result in artifacts. In the depiction in FIG. 4B, the analysis diagram 420 has analysis 422 at the root. Beneath the root 422 are two varieties of analysis: static analysis 424 and dynamic analysis 426. Examples of static analysis 424 include structural analysis 430 for analyzing the structure of the generated programming code and analysis of the runtime behavior 432 of the generated programming code. An example of the structural analysis 430 is coding standard analysis 440 for determining whether the generated programming code conforms with coding standards, such as Misra C. Another type of structural analysis 430 is analysis 442 that identifies logic errors in the generated programming codes or that identifies bugs that are present in the generated programming code. Examples of such analysis is the analysis performed by programs such as debuggers and logical analysis tools. A further type of analysis of runtime behavior 432 that may be applied is that which is performed by a code prover 444. The code prover 444 may identify logic errors and bugs but also may identify whether a portion of the generated programming code is provably correct.

The analysis 422 may also be dynamic analysis 426. Examples of dynamic analysis 426 include the analysis performed by a code profiler 436. Code profilers profile the performance of the generated programming code when executed. Information, such as memory usage, CPU usage, and the like, may be provided by the code profiler 436. Another type of dynamic analysis 426 is code coverage analysis 438. Various programs and tools may be applied to determine whether there is complete coverage or not. There dynamic analysis 426 may analyze different types of coverage. For instance, the dynamic analysis 426 may analyze decision coverage, condition coverage, condition/decision coverage, modified condition/decision coverage, statement coverage, etc.

These analysis tools, may generate artifacts as mentioned above. The types of artifacts depend upon the nature of the tool. For instance, a coding standard analysis tool 440 may produce an identification of what components in the generated programming code do not conform with the coding standard that is being applied. In contrast, a logic errors and bugs analysis tool 442 may produce artifacts in the form of identification of where there are logic errors in the generated programming code and where there are bugs in that generated programming code. For example, a code prover tool 444 may identify a division by zero operation, whereas other types of tools may not identify such an operation. A code profiler 436 produces artifacts, such as how much memory a function in the generated programming code uses and how much CPU time a function in the generated programming code uses when executed.

Figure 5A:
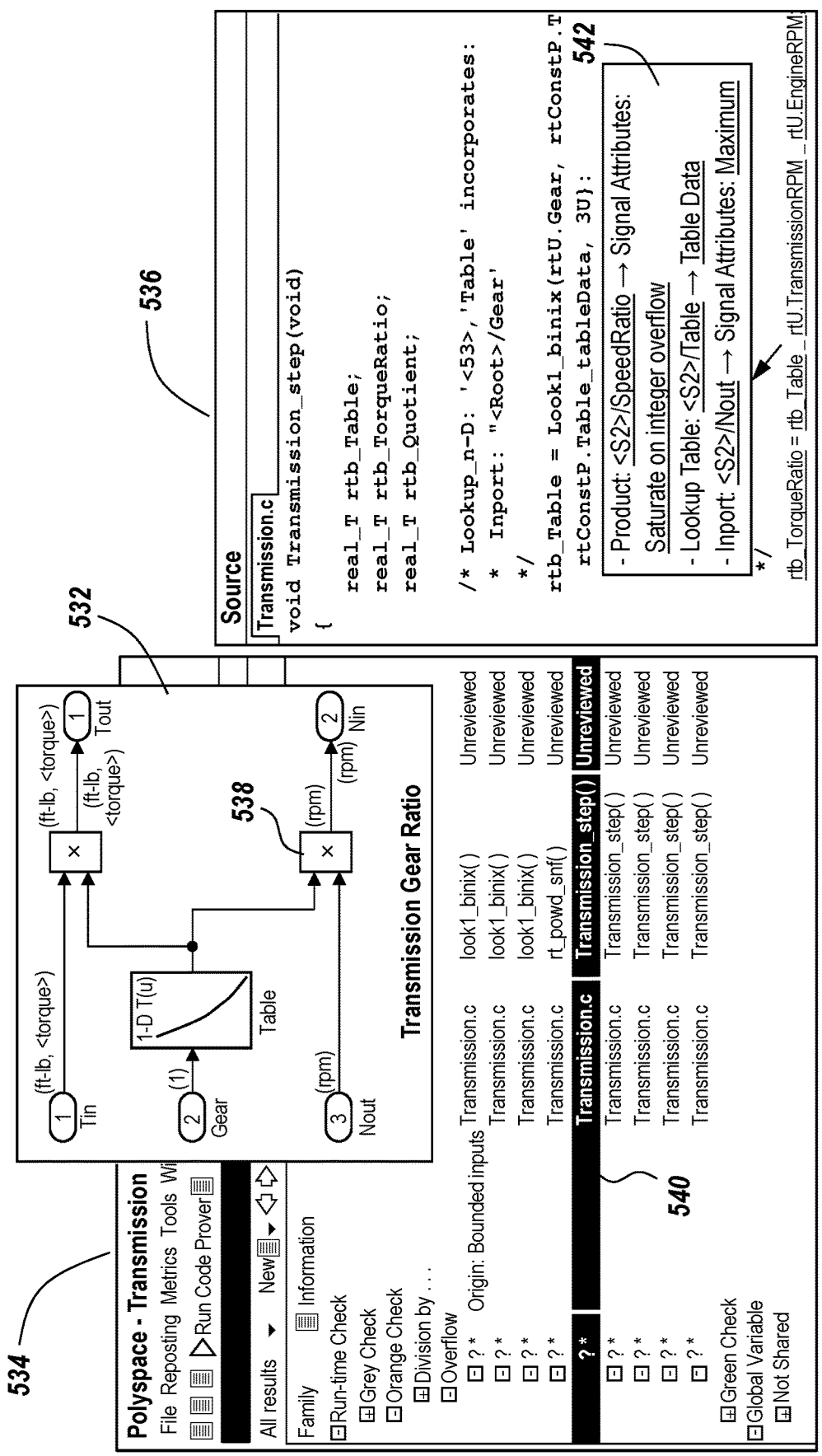

FIG. 5A shows an example of a user interface where a visual cue is provided to identify the association of source aspects with an artifact. In this case depicted in FIG. 5A, a code prover is applied to the generated programming code shown in window 536. As can be seen by the tool tip 542, the code prover detects that the multiply operation of the code at line 364 can potentially lead to an overflow and generates the tool tip 542. This multiply operation is generated from product block 538 (see model 532) that takes two input signals, one that is output from a lookup table and one that is output from an inport. The tool tip 542 indicates that there are options to fix the artifact. One can fix the artifact by selecting the signal attribute of "saturate on integer overflow" of the product block, or one can specify bounds on the input signals. This specifying of bounds can be achieved by changing a "Table Data" attribute on the lookup table block and specifying in the signal attribute to have a "maximum" value on the inport block.

FIG. 5A also shows a depiction of the model 532 with the multiply block 538 highlighted to indicate an atomic source aspect that produces the artifact. Also shown in FIG. 5A is a window 534 for the code prover that identifies the error at line 540 as an overflow error.

Figure 5B:
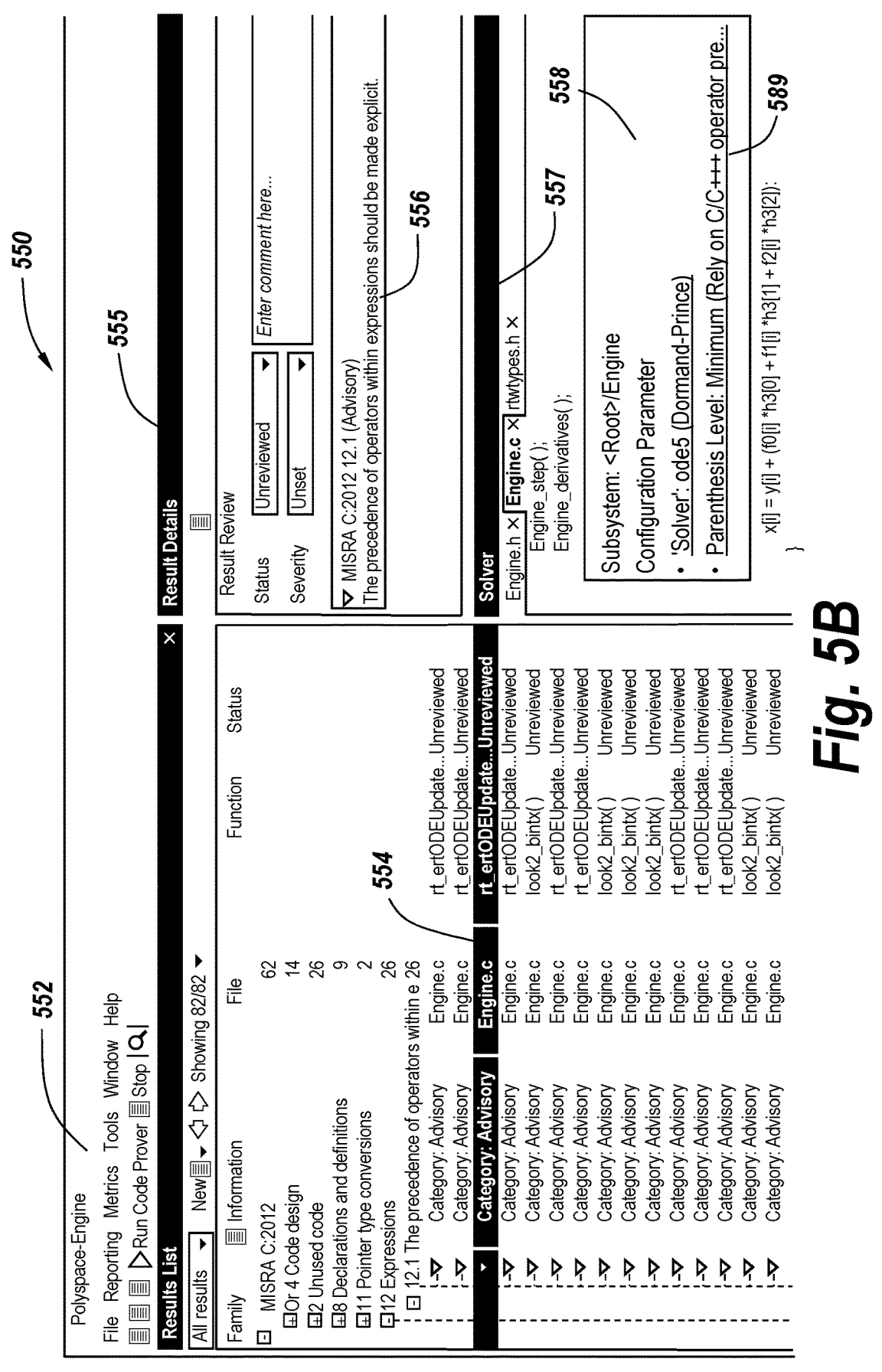

FIG. 5B shows an example 550 of the code prover being applied to identify a coding standard violation in the generated programming code. As shown in FIG. 5B, the code prover window 552 contains a highlighted entry 554 identifying that there is a coding standard error. A Window 555 is displayed that provides details 556 of the coding standard violation. Window 557 is displayed and contains a listing of the generated programming code with tool tip 558. The tool tip 558 notes that there are multiple source aspects associated with this coding standard violation. The tool tip 558 identifies the subsystem of the model in which the error originates ("Engine") and specifies the appropriate configuration parameters that result in the coding standard violation. See 'Solver': ode5 (Dormand-Prince) and Parenthesis Level: Minimum (Rely on C/C++ operator precedence). By specifying the configuration parameters, one can change the parameters to fix the coding standard violation. Hyperlink 559 may be selected to call up a user interface element for making the change as to the parenthesis level. For example, in this case, changing the parenthesis level from minimum to maximum will fix the coding standard violation.

Figure 6A:
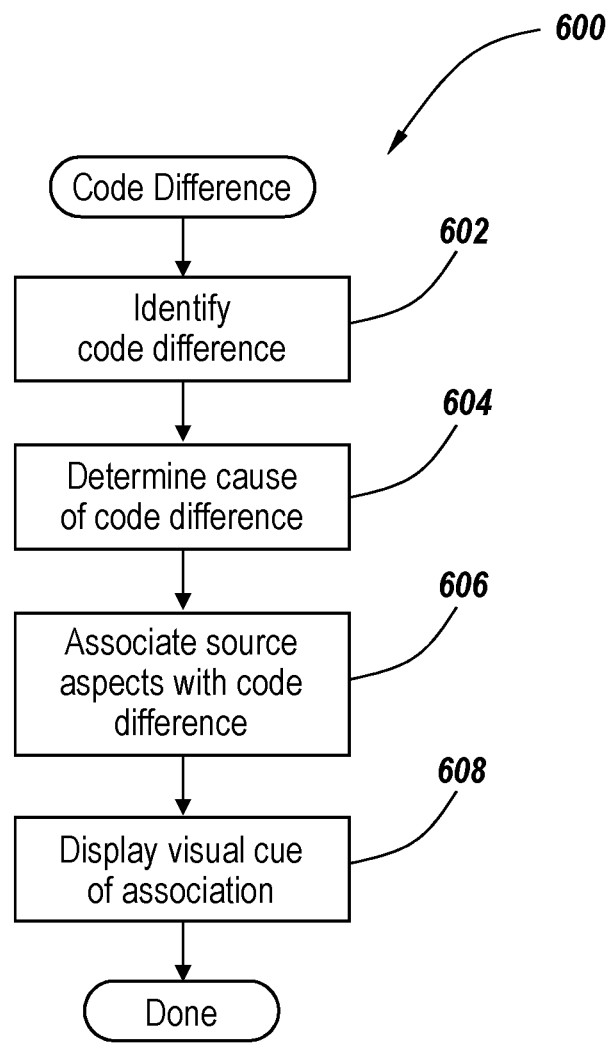
FIG. 6A is a flowchart illustrating steps performed to associate differences in generated programming code to source aspects.

As was mentioned above, the exemplary embodiments may perform code differencing and provide visualization of associations between code differences and the causes (source aspects) of the code differences. This may be applied to different versions of generated programming code. FIG. 6A provides a flowchart 600 of the steps performed with respect to code differences. Initially, code differences are identified in step 602. This may be performed by code differencing engine that compares the generated programming code at issue and identifies any differences. In step 604, the cause of the code differences is identified. The code differences are displayed and their causes may be displayed in step 606. Thus, the system may identify the code differences and what in the sources caused the code differences.

Figure 6B:
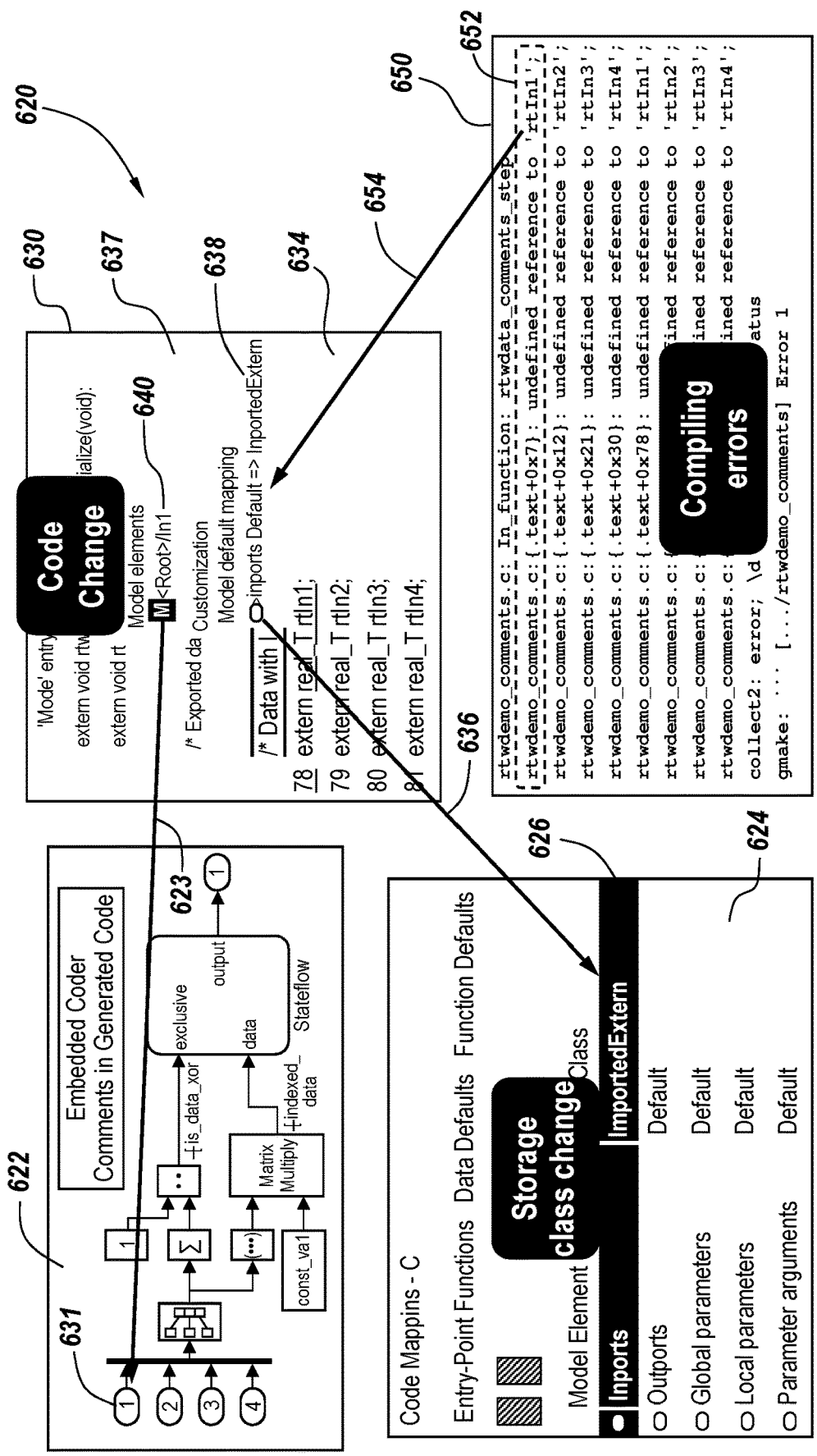
FIG. 6B depicts an example of a user interface depicting associations among a source aspect, a code change and a compiling error.

FIG. 6B shows an example of a user interface that helps illustrate the identification visualization of associations related to code differencing and artifacts. In the diagram 620 of FIG. 6B a first window 622 depicts a model. Also shown is a window 624 identifying storage class information. A third window 630 depicts generated programming code. In the example depicted in FIG. 6B, the inport 631 shown in window 622 depicting the model is associated with the illustrative portion of the generated programming code shown in window 630 as indicated by directed arrow 623. In particular, the highlighted section 634 contains line 78 which may be associated with the inport 631. Popup window 637 identifies that line 78 in the generated programming code is associated with inport 631 as evidenced by entry 640. The popup window 637 also notes that the signal value output by the inport 631 has been changed from a default storage class to an imported external storage class as indicated by entry 638. Window 624 shows that the inports have been specified as imported external storage class as indicated by the highlighted entry 626. The association between element 626 and the entry 638 in the popup window 637 is captured by the directed arrow 636. This association captures the cause for the change in the generated programming code. These changes may be produced by a code differencing engine and highlighted as indicated in the code listing of the generated programming code.

FIG. 6B also shows an example of an artifact associated with the code change. In this example, the change of storage class resulted in a compiling error as indicated by entry 652 in window 650. The compiling error is an undefined reference to rtInl. This association is captured by the directed arrow 654 in FIG. 6B. Thus, the association between what caused the compiling error and what caused the code change may be represented in such a user interface for an exemplary embodiment.

Figure 7:
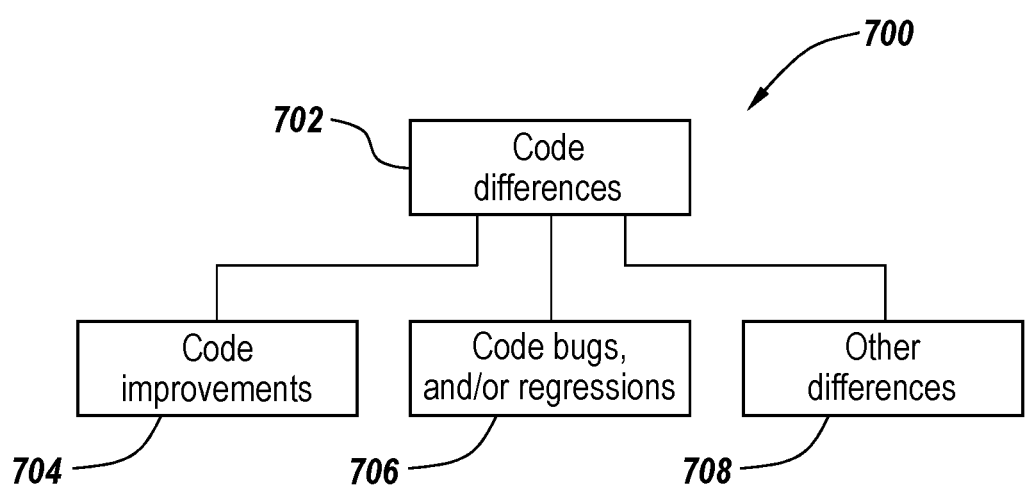
FIG. 7 illustrates exemplary different types of code differences.

FIG. 7 shows an example of certain illustrative code differences that may be identified by the code differencing engine that may be of interest. As shown in the diagram 700, the code difference 702 may include code improvements 704. One may be interested to know why the code improved and what atomic source aspect produce the improvement in the generated programming code. The code differencing engine 702 may in conjunction with other tools (such as debuggers) also identify bugs and/or regressions that are found between versions of generated programming code. Other types of differences may also be identified as a result of the code differencing 708. Code differences are not limited to code improvements 704 or code bugs and regressions 706.

Figure 8A:
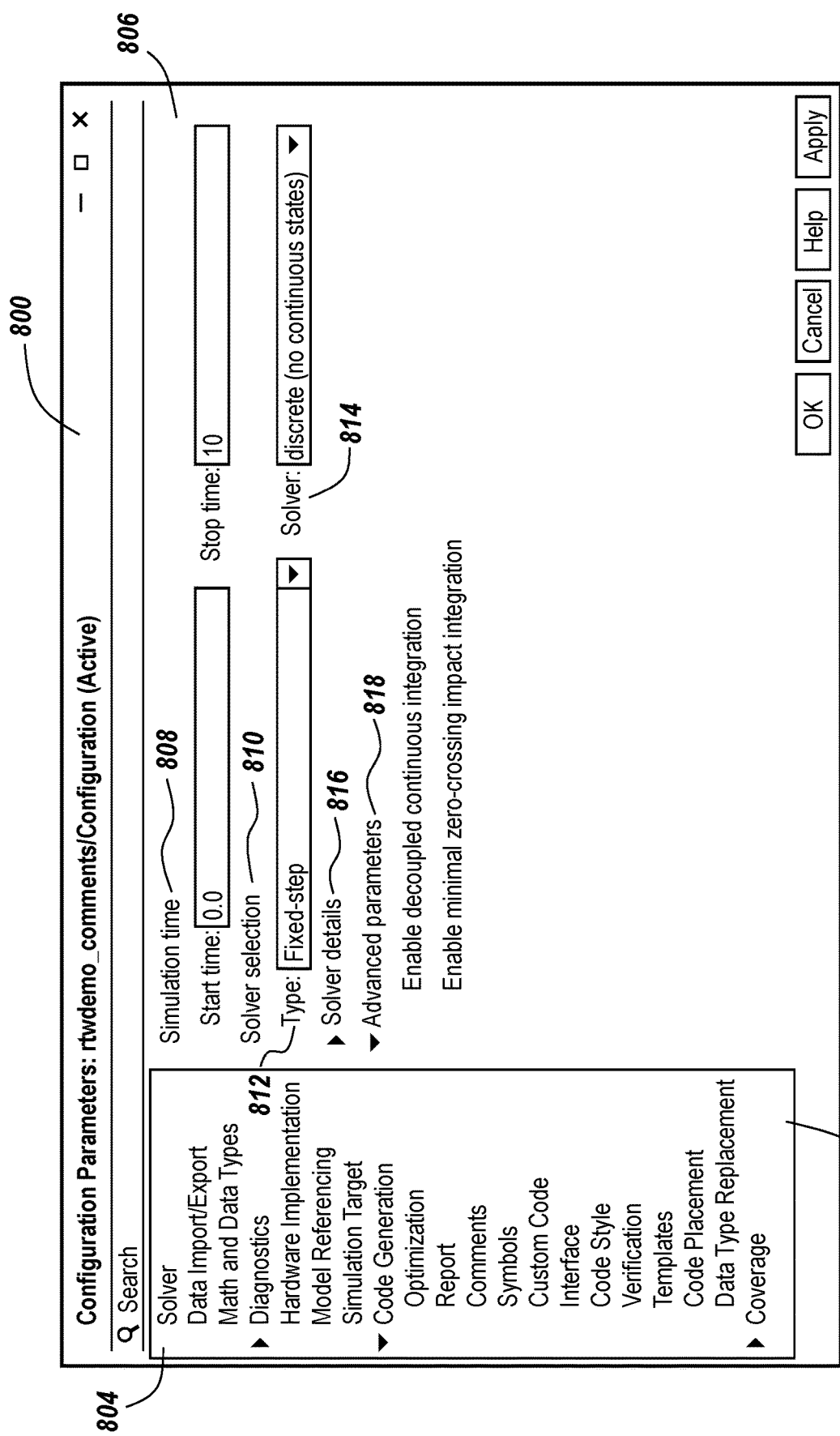
FIG. 8A illustrates an exemplary user interface in which parameters for a solver may be chosen.

As is discussed above, configuration settings may influence the programming code that is generated. FIG. 8A shows an example of the type of atomic configuration settings that may affect generated programming code. In particular, as shown in FIG. 8A, the user interface 800 includes an option 804 in the left pane 802 that when selected results in the display of settings relating to choice of solver. As can be seen in the right pane 806, a user may specify simulation time parameters 808. The user may also specify a type of solver 812 and a particular solver 814 in the solver selection of section 810. The choice of the type of solver and a particular solver may affect the programming code that is generated. In the example shown in FIG. 8A, the type of solver 812 is selected as a fixed step solver. The particular solver is specified by entry 814 as a discrete solver having no continuous states. Other solver configuration values 816 may be displayed and specified via the right pane 806. FIG. 8A shows an example in which certain advanced parameters 818 may be selected or deselected.

Figure 8B:
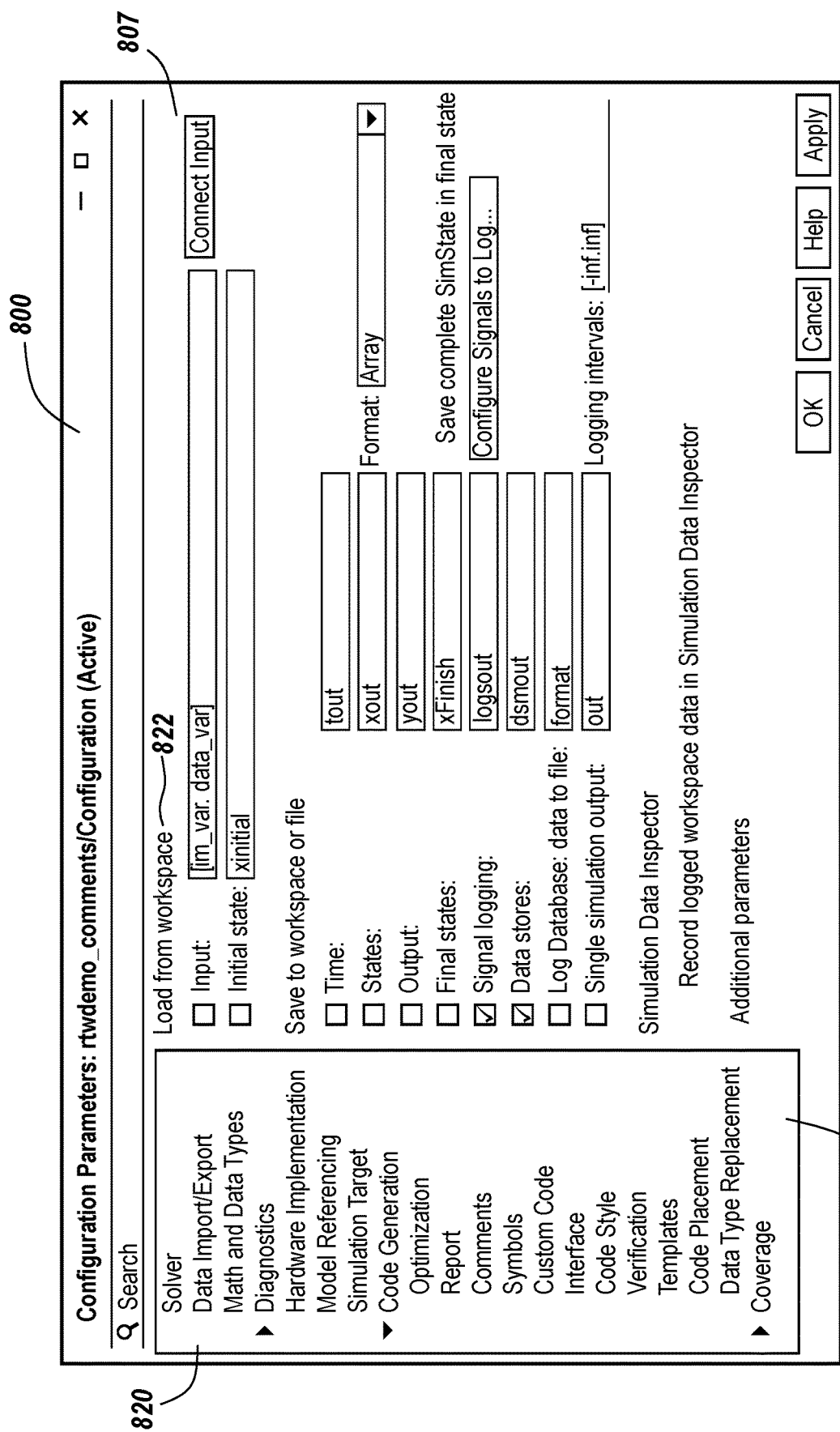
FIG. 8B illustrates an exemplary user interface in which an import/export settings may be selected.

FIG. 8B shows a user interface 800 in which data import/export parameter values are set. The user has selected entry 820 in the left pane 802 to display the right pane 807. The right pane 807 provides various options in section 822 for loading input or initial state from a workspace. MATLAB, for example, contains a workspace for holding variables with values such as working values that may be modified during the execution of MATLAB code and/or Simulink models. The right pane 807 also includes a section 824 for specifying various parameters that relate to saving values to the workspace or to a file. Specifying these parameters may modify the programming code that is generated from the model.

Figure 8C:
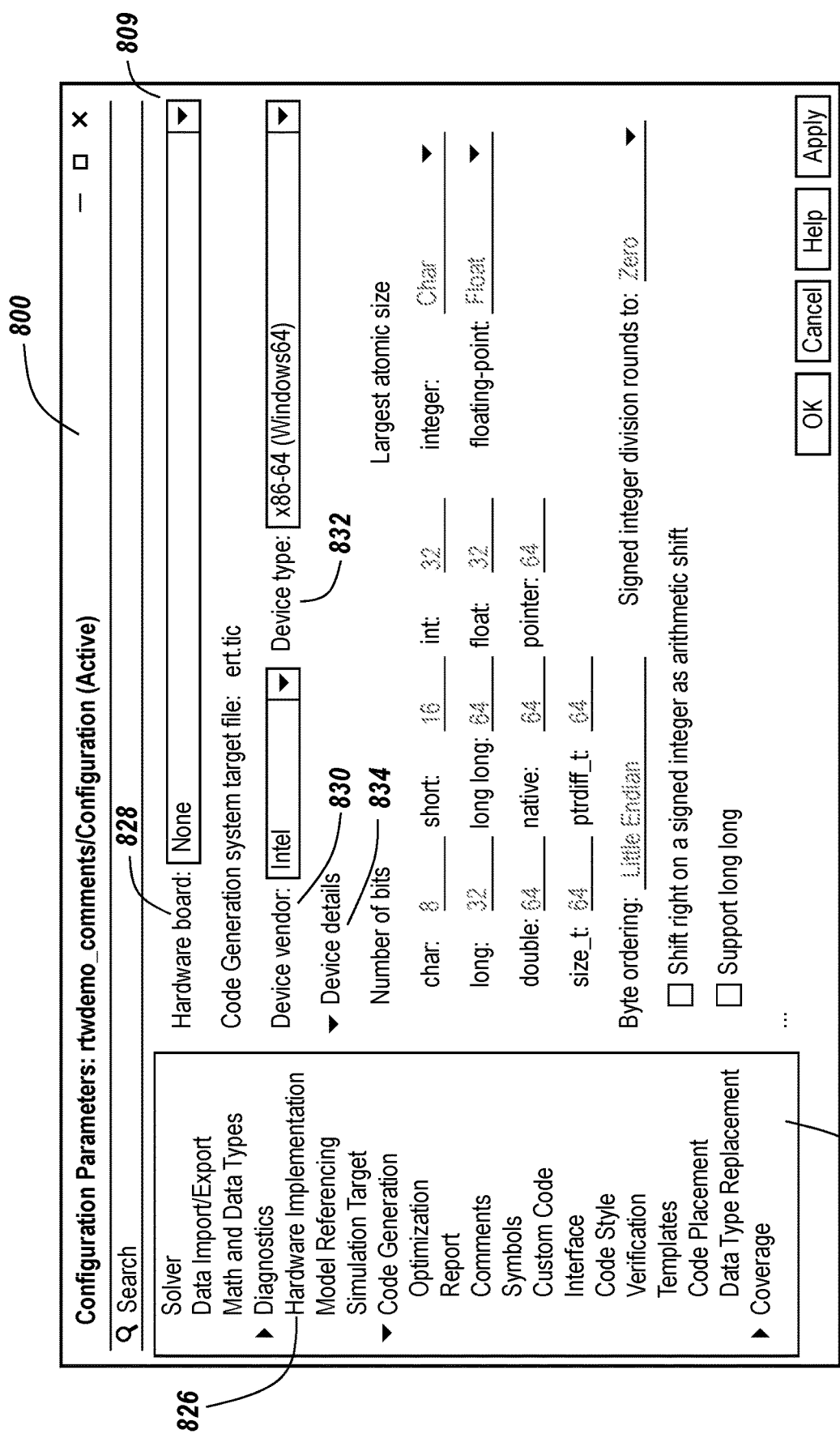
FIG. 8C is an exemplary user interface illustrating an example in which hardware implementation parameters may be selected.

FIG. 8C shows an example of a window 800 in which a user has selected a hardware implementation option 826 from the left pane 802. The hardware implementation refers to the hardware implementation for which the code is generated. One then may specify a hardware board 828, a device vendor 830, and a device type 832. Various other parameters 834 relating to the hardware implementation may be specified as well. For example, the bit sizes for data types, such as char, short, and long, may be specified. In FIG. 8C, the bit size for char is specified as 8 bits, for short as 16 bits, and for long as 32 bits.

The configuration settings may also relate to naming rules, such as shown in FIG. 8D. FIG. 8D shows two versions of a window 800 and 801 in which a user selected a symbols option 836 in the left pane 802. As can be seen in FIG. 8D, the right pane 811 contains a number of different naming rules for things such as global variables and global types. Window 801 includes a popup 838 that explains some of the syntax of the naming rules. The popup identifies what macros may be applied to derive specified portions of the identifier name for a global variable. In particular, SM refers to the macro mangle, SR refers to the root model name macro, G refers to the storage class name macro, N refers to the name of the object being identified macro, and V refers to the user token text macro. The macro names reflect their functionality. For instance, SG, the storage class macro, obtains character(s) reflecting the storage class of the variable. The selection of the naming rules may affect the programming code that is generated from the model.

Figure 8E:
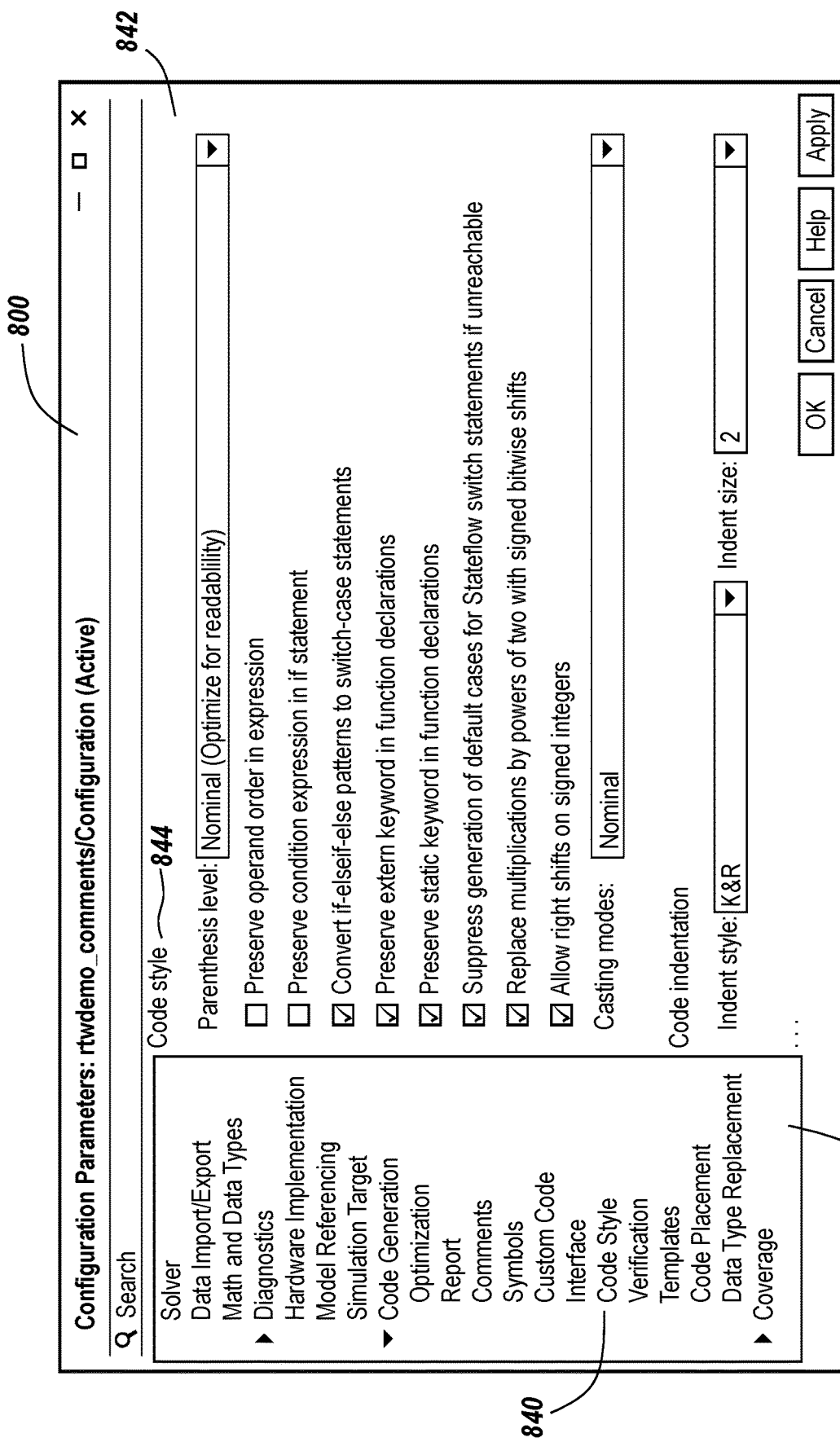
FIG. 8E illustrates an exemplary user interface in which code style parameters may be selected.

Another configuration setting that may affect the programming code that is generated from the model is a code style setting. In the example shown in FIG. 8E, the user has selected the "code style" option 840 from the left pane 802 to establish the code style parameters listed in the right pane 842. The user may then select a number of different options using check boxes and dropdown lists that may affect programming code that is generated from the model. For example, the parenthesis level may be established, such as the nominal level option shown in FIG. 8E. Parameters such as converting if-then-else patterns to switch case statements or preserving static keywords in function declarations may be established. As to code indentation, an indent style may be established and an indent size may be selected.

Figure 9A:
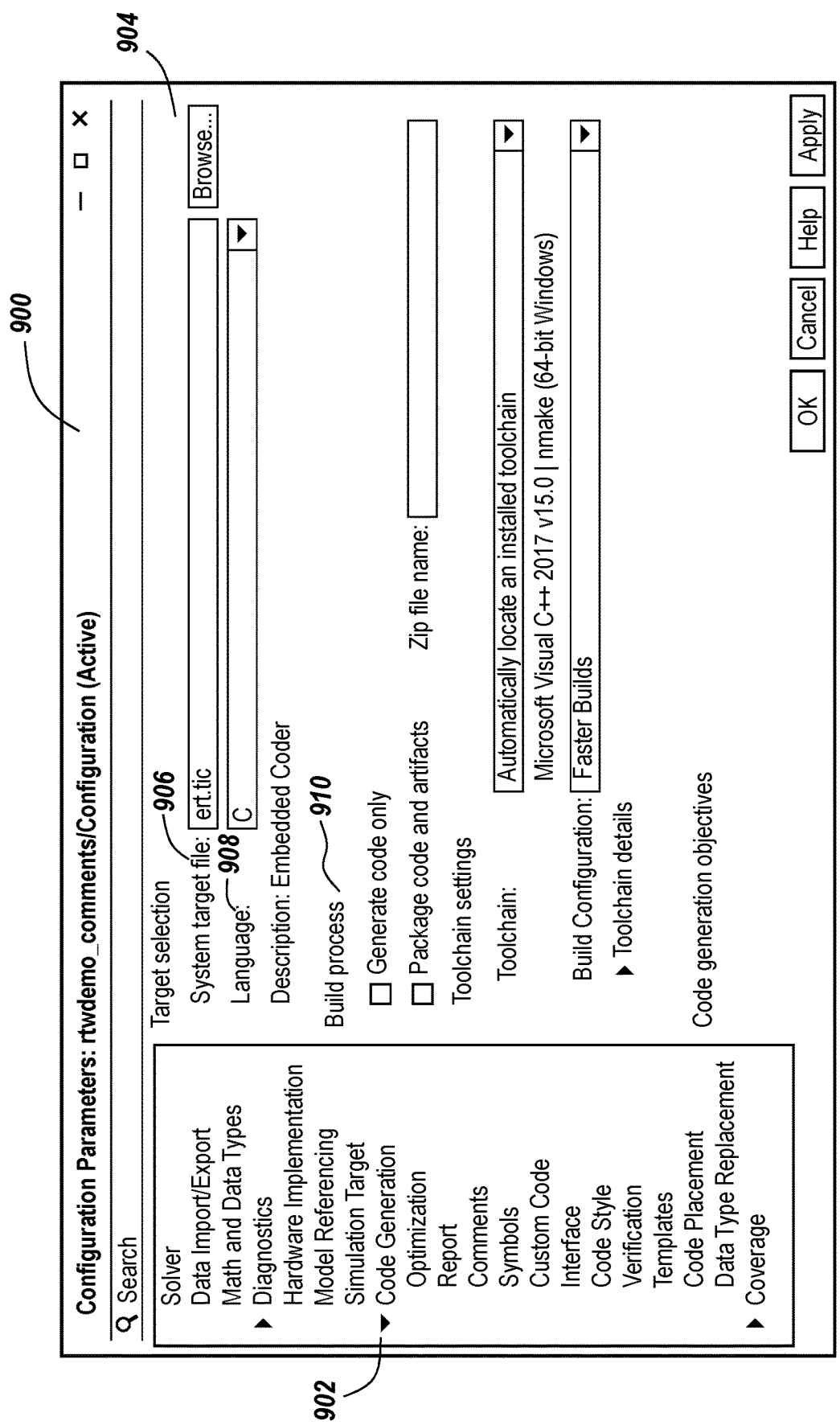
FIG. 9A illustrates an example of an exemplary user interface in which code generation parameters may be selected.

As was discussed above, certain settings for the code generation may be selected that affect the programming code that is generated from the model. As shown in FIG. 9A, window 900 displays a code generation option 902 that may be selected to display the right pane 904. Amongst the values that may be set is a name of a system target file 906 and the programming language 908 in which the code is to be generated. The system target file is a file that is used to convert a model into generated programming code. The system target file describes how to generate code for a given target. The right pane 904 also displays a number of options relating to the build process 910, such as whether to generate code only (e.g., whether to proceed and compile the generated code or not) and/or to package code and artifacts.

As was discussed above, the choice of optimizations for code generation may affect the programming code that is generated.

Figure 9B:
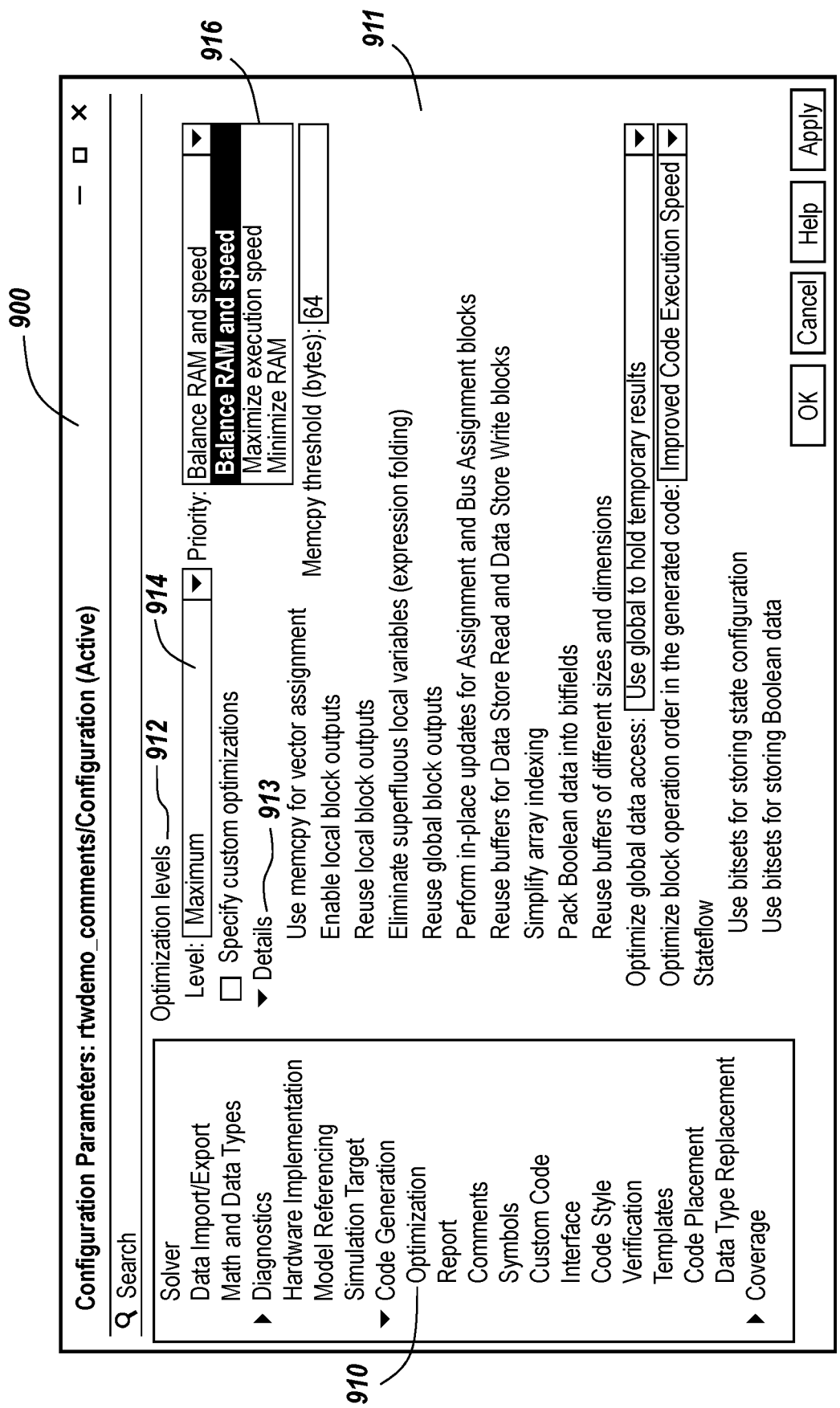
FIG. 9B illustrates an exemplary user interface in which optimization levels and priorities may be a selected.

FIG. 9B shows an example in which an optimization option 910 is selected so that the right pane 911 displays a number of optimization level settings 912. In the example shown in FIG. 9B, a dropdown list 914 specifies the optimization level. This level may be minimum, maximum or an in between value. In the example shown in FIG. 9B, the optimization level is set at maximum, which causes the dropdown list 916 to include the three options of balancing RAM and speed, maximizing execution speed, or minimizing RAM. Depending on which option is chosen a number of check boxes may be available under the details section 913. For example, options are shown to enable local block outputs, reuse local block outputs, use expression folding, reuse global block outputs, simplify array indexing, reuse buffers of different sizes and dimensions, etc. In addition, options are shown regarding how to optimize global data access and/or how to optimize block operation order in the generated code. The choice of the "Balance RAM and Speed" option for priority (see 916) sets the values for many of these other parameters. One can see that many of the checkboxes are checked or unchecked after this choice. In addition, values are selected for the "Optimize global data access" to "Use global to hold temporary results" and for the "Optimize block operation order in the generated code" to "Improved code execution speed."

Figure 9C:
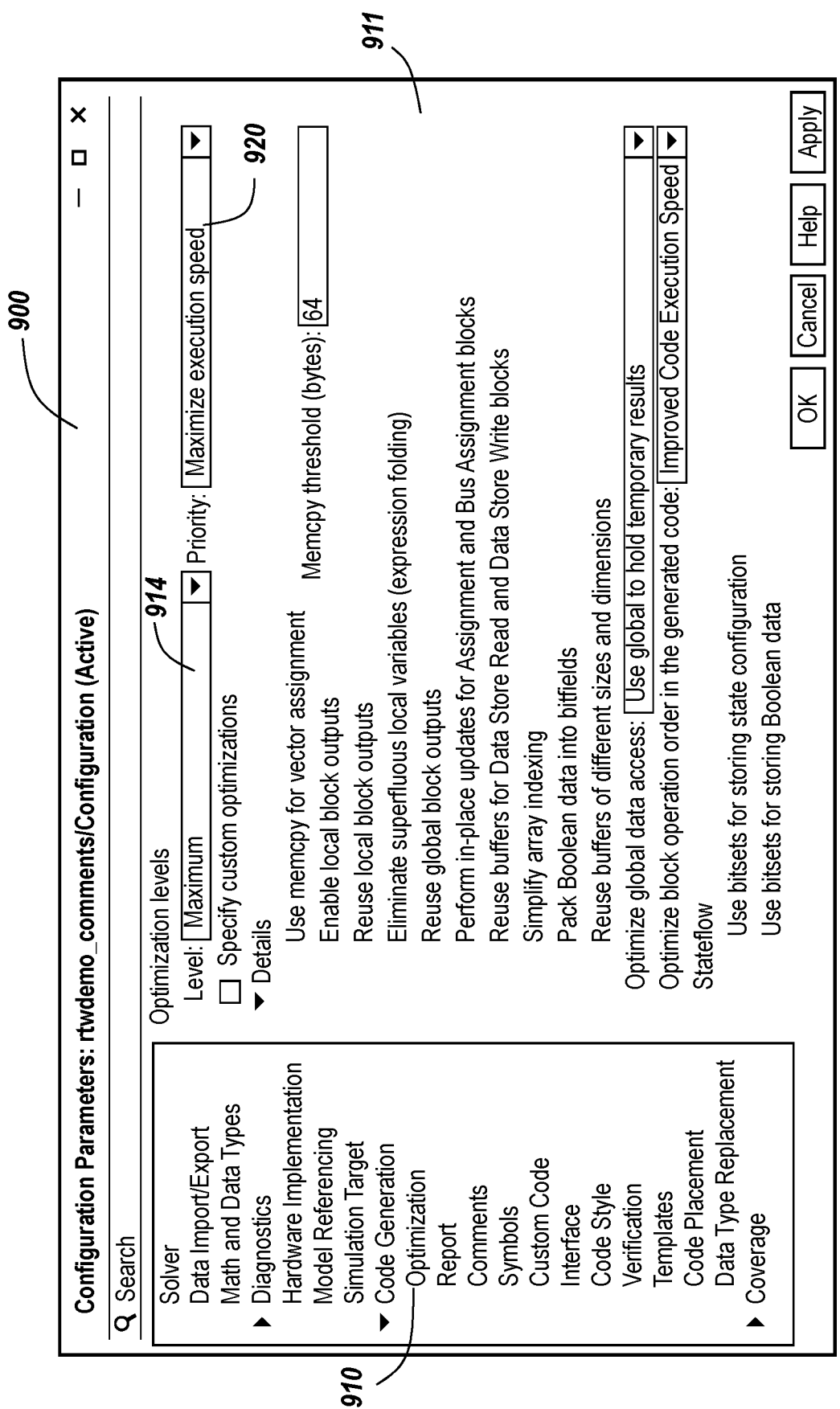
FIG. 9C illustrates an exemplary user interface in which the priority of maximize execution speed has been selected.

FIG. 9C shows the appearance of the right pane 911 when the maximum level 914 is selected and the priority of maximizing execution speed 920 is selected. It is worth noting that some of the checkboxes and list box selections are changed relative to FIG. 9B. In particular, the "Simplify array indexing" box is checked in FIG. 9C and the "Optimize global data access" list has "None" selected. This illustrates the effect that a non-atomic source selection has on the settings for atomic sources.

Figure 9D:
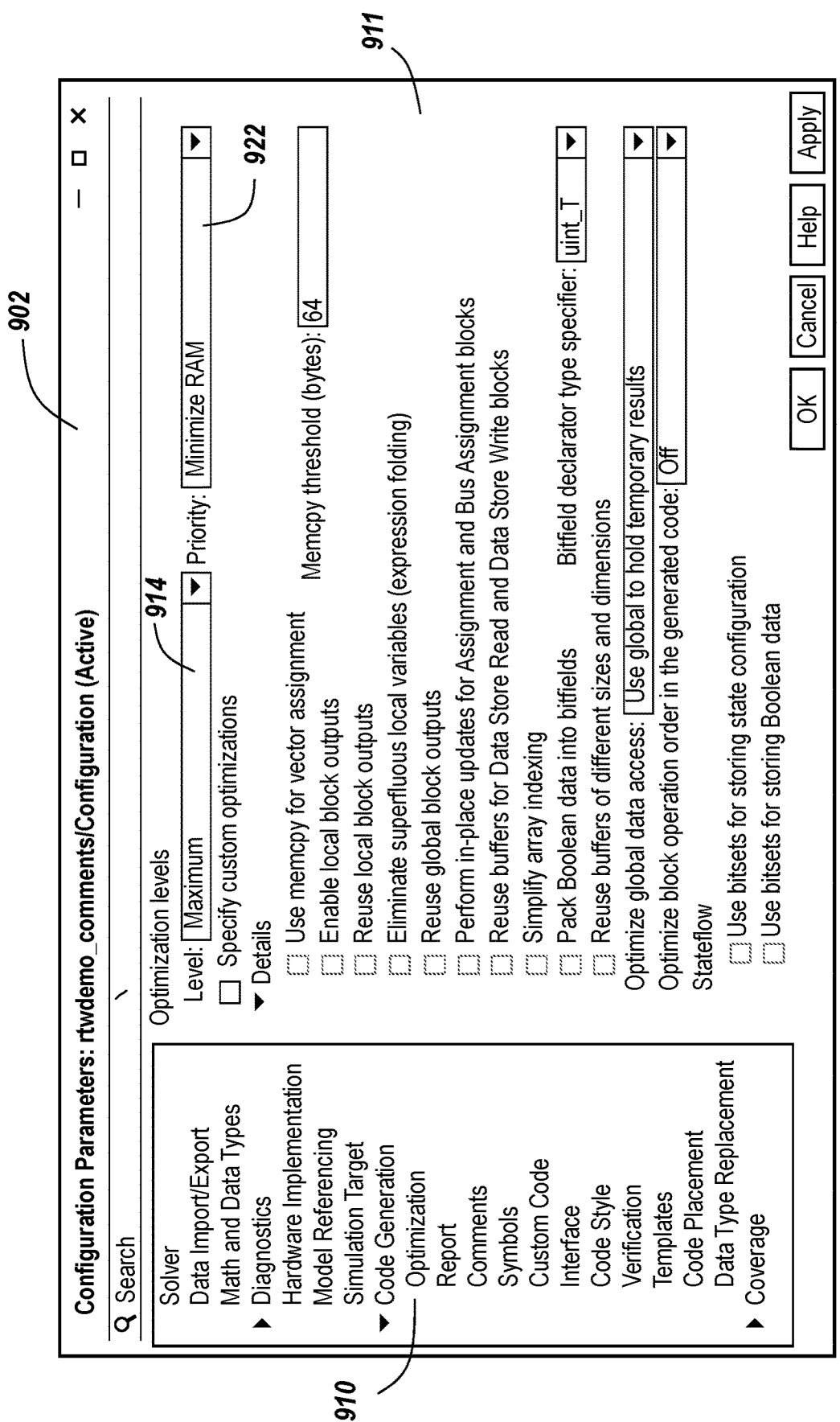
FIG. 9D illustrates an exemplary user interface in which the priority of minimize random access memory (RAM) usage has been selected.

FIG. 9D shows an example in which the maximum level 914 is selected and the Minimize RAM priority 922 is selected. As a result, the "Pack Boolean data into bitfields" and "Reuse buffers of different sizes and dimensions" checkboxes are selected. In addition, the list box "Optimize block operation order in the generated code" has the "Off" option selected. This is an example of two non-atomic source aspects (i.e., maximize optimization level and Minimize RAM as a priority) affect the selection of atomic source aspects (i.e., the listed check boxes and list boxes). These user interface depictions in FIGS. 8 and 9 are not intended to be limiting but rather are intended merely to be illustrative. It will be appreciated that a number of different user interfaces may be used to select the atomic configuration settings. The atomic configuration settings may include more or less than those depicted.

The exemplary embodiments are able to determine interdependencies among source aspects and the resultant features in the generated programming code. The exemplary embodiments may capture the relationships among source aspects and assess how the source aspects affect the generated programming code. This capturing of these relationships allows the determination of the associations between components of features in the generated programming code and source aspects. The captured associations facilitate reverse code generation where code may be changed, and the system derives changes to source aspects to achieve the desired code changes.

Figure 10A:
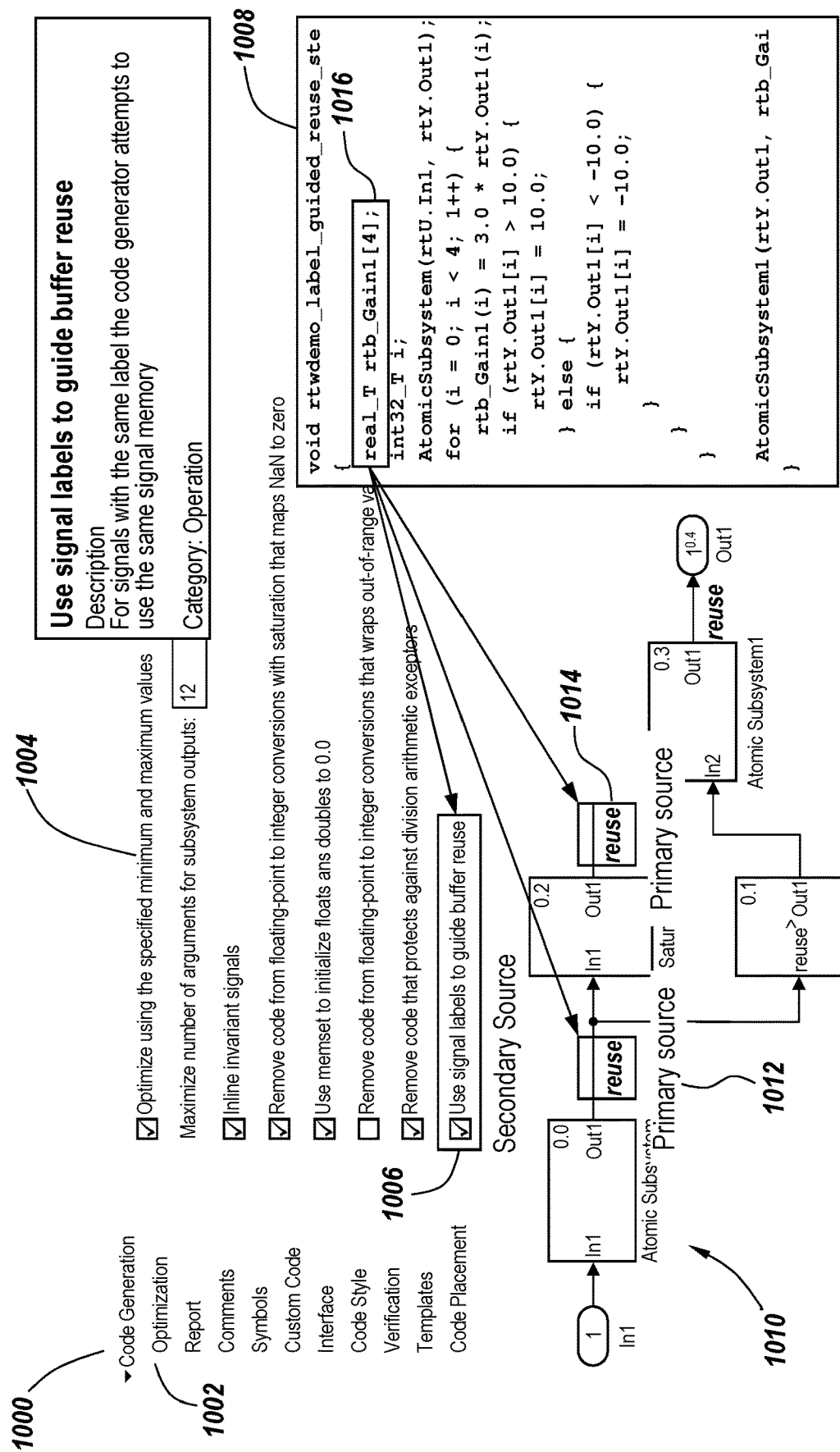
FIG. 10A depicts an example of a logical AND relationship among source aspects.

Multiple relationships relating to the source aspects may be captured and stored in a fashion like that discussed relative to FIG. 2C. A first example of such a relationship is a logical AND relationship in which multiple source aspects are necessary to achieve a specific code effect. For example as shown in FIG. 10A, an optimization setting 1006 that allows label based buffer reuse along with multiple signal lines having the same label are an example of source aspect values having a logical AND relationship. FIG. 10A shows a window 1000 in which code generation related configuration settings may be set. In this instance, the "optimization" settings 1002 have been selected. The right pane 1004 of the window 1000 has a number of settings that may be set by selecting check boxes. One of these settings 1006 sets that signal labels guide buffer reuse. In FIG. 10A, this setting 1006 is selected.

This is an example of a logical AND relationship in that multiple source aspects are necessary to produce an effect in the generated programming code. Thus the effect can be associated with the multiple source aspects and indicated by the arrows in FIG. 10A. Often, this type of relationship is found between a broader source aspect (e.g., a model wide setting) and a narrower source aspect (e.g., a local setting). In this illustrative case, the "use signal labels to guide buffer reuse" setting 1006 is the broader source aspect because the setting 1006 applies to the entire class of signal label instances. The multiple signal lines 1012 and 1014 (see model 1010) having the same label is the narrower source aspect because it applies to the particular instance of the same labels for signal lines 1012 and 1014. The resultant component 1016 in the generated programming code is shown in code listing 1008. If either of these source aspects is not present, as shown in FIG. 10B the component 1020 is different such that there is no buffer reuse in the generated programming code listing 1002 in contrast to component 1016 in FIG. 10A.

Source aspect values may also have a logical OR relationship where multiple source aspects can independently have an effect on the generated programming code. For example, as will be discussed in more detail below relative to FIG. 11B, a signal name in the generated programming code may result from a change of the signal name in the model or a change in the storage class specified for the signal.

Another example of a relationship is an override relationship in which one configuration setting value overrides another, but both settings contribute to an effect in the generated programming code.

FIG. 10C depicts an override relationship among source aspects. In particular, the setting of a storage class to "ExportToFile" for In1 on line 1046 of the model data editor 1042 overrides the default storage class for the group of inports indicated by setting 1044 in window 1040.

FIG. 10D shows an example 1060 wherein all the inports have the default storage class. FIG. 10E shows the case where the storage class for In1 has been changed to "ExportToFile" 1062 while the storage class is specified (see 1064) for the other inports to remain as the default storage class.

An additional example of a relationship among configuration setting values that is captured by exemplary embodiments is a combination relationship. In such a combination relationship, multiple configuration setting values in combination result in an effect in the generated programming code. An illustrative case is that of a naming rule (see 838 in FIG. 8D) where multiple parts of a naming rule may originate from different source aspects values (such as root model name, storage class name, etc.). For example, as shown in 838 the global variables has a naming rule "rt$N$M." This rule indicates that the "rt" becomes a leading part of the variable name followed by the name of the object which, in turn, is followed by the macro mangle as shown in FIG. 8D.

Lastly, the exemplary embodiments may capture and identify a composite relationship among configuration setting values. Such a composite relationship arises out of recursively applying any of the other types of relationships like those detailed above.

Figure 11A:
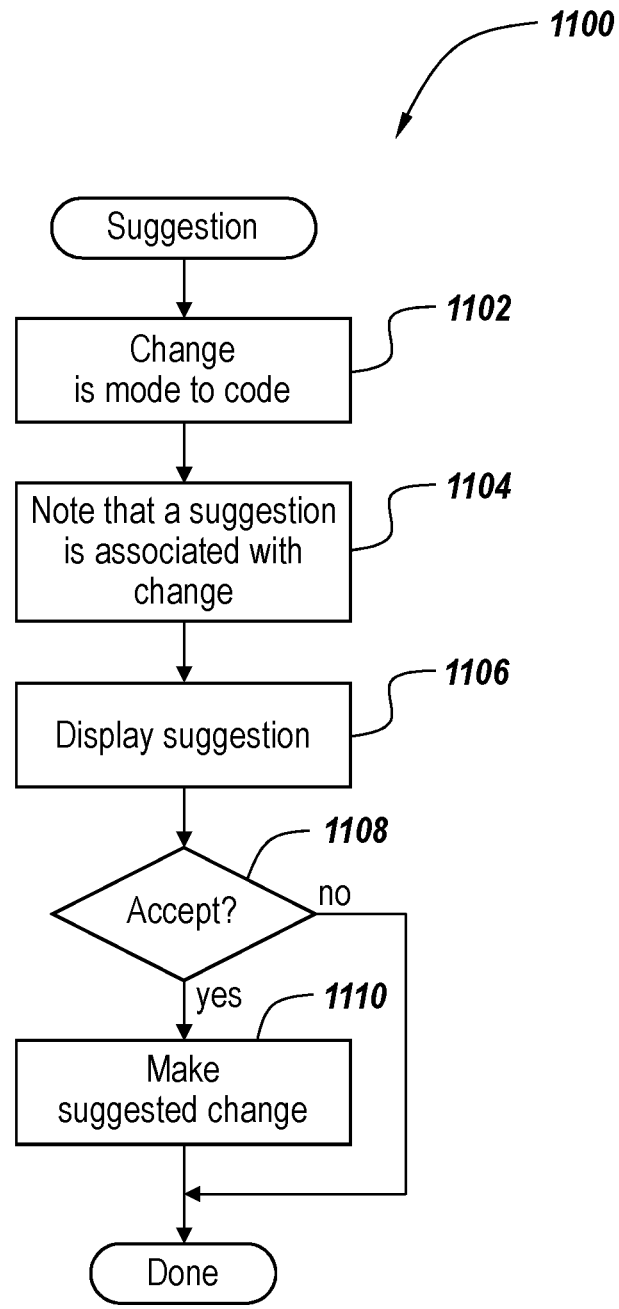
FIG. 11A is a flowchart of steps that are performed to generate and accept suggestions in an exemplary embodiment.

The exemplary embodiments may produce suggestions when a user makes a modification to a particular line of the generated programming code. FIG. 11A provides a flowchart 1100 of the steps that may be performed relative to such suggestions. Initially, in step 1102, a change is made to the generated programming code. The system notes that the change is associated with a change (step 1104). In this example, the subsystem is a Simulink subsystem. A suggestion is displayed (step 1106) in response to the change. For example, the system may be configured so that changes to variable names or other changes produce associated suggestions. The suggestion explains how atomic source aspects may be modified so that the generated programming code has the changes without the need for manual editing of the change. Where there are multiple suggestions, the suggestions may be displayed in a prioritized order based on a predetermined prioritization system or may be displayed without a prioritized order. The priority may be based on information such as past behavior, a received preference (such as from a user), a rule, or other basis. In some embodiments, the user may have the option of accepting the suggestion or not. Thus, in step 1108, a determination is made whether the suggestion is accepted (i.e., automatically modifying the atomic source aspect(s) identified in the suggestion). If the suggestion is not accepted, the identified atomic source aspects are not modified. However, if the suggestion is accepted, to the suggested changes to the atomic source aspects are made in step 1110 and the generated programmatic code may be (automatically) regenerated to account for the changes in the sources aspects elsewhere in the model.

The suggestions may be determined from the stored information, such as discussed relative to FIG. 2C. As the decision points of the code generation process and associated information may be stored, the stored information may be used to identify how to produce the desired change. For instance, one can determine the effects of modifying a storage class from the stored data information and if one of the effects is the desired change, an appropriate suggestion may be generated.

The system captures and stores the appropriate information for capturing the interdependencies and generating suggestions. For example, the system may capture and store information regarding the above-mentioned logical AND relationships. This information and the effective scope information may be used to provide suggestions on what source aspects need to be changed to get the desired feature in the generated programming code. For instance, if a user disables buffer reuse for a single buffer, the suggestion may be relabeling the signals with different labels in view of the logical AND relationship.

With a logical OR relationship, the system knows that all sources must change to result in the associated component(s) in the generated programming code.

Similarly with an override relationship among source aspects, the system captures and stores all source aspects and the override relationship. Thus, if a default storage class is overridden, the default storage class information is still captured along with the overriding information. Thus, if the overriding setting is removed, the default storage class may be restored.

Figure 11B:
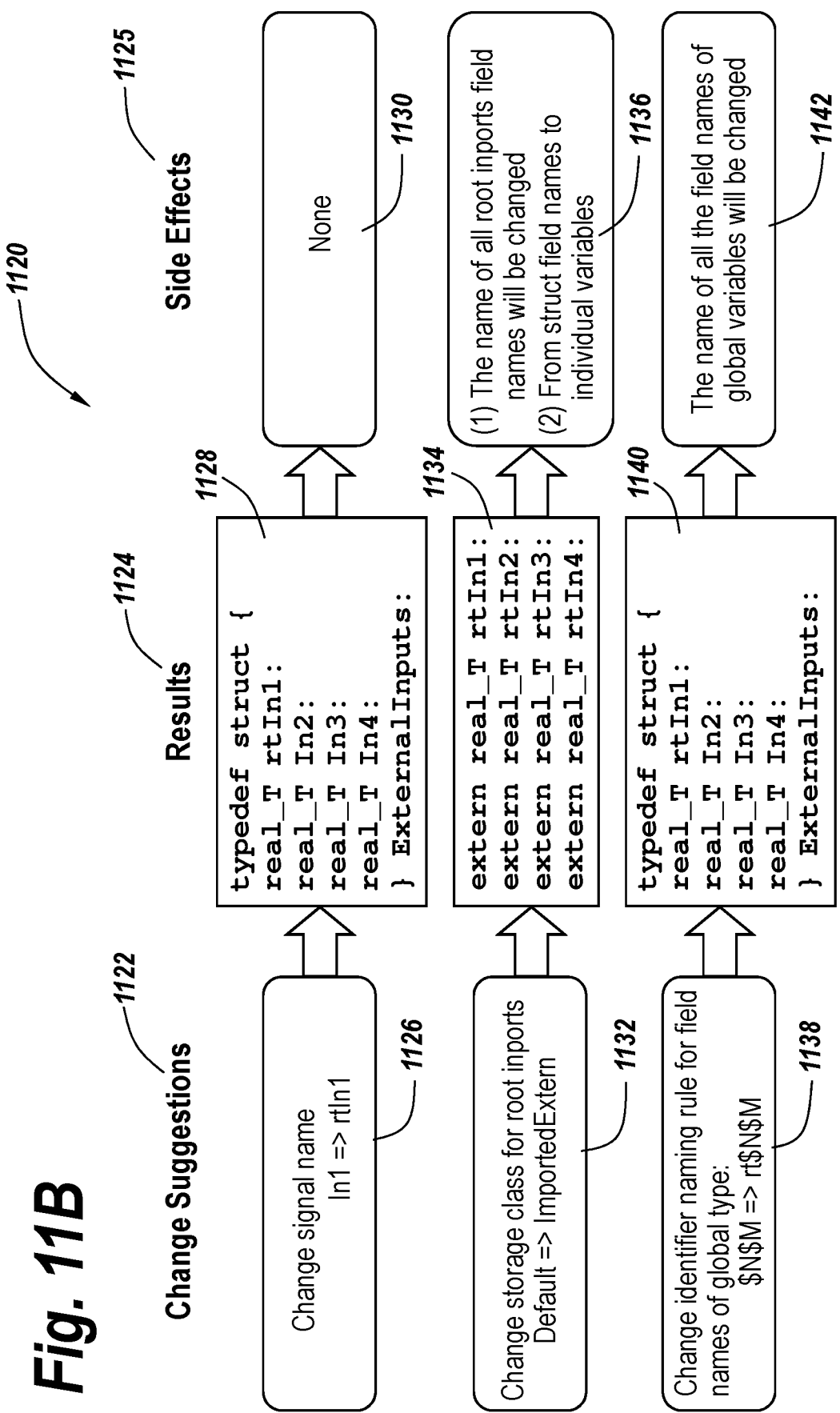
FIG. 11B shows an example of suggestions, the results of accepting the suggestions and possible side effects.

FIG. 11B shows an example 1120 that displays in tabular form change suggestions 1122, the results of accepting the change suggestion 1124 in the same row and the side effects 1125 of accepting the suggestions. In this example, a user wishes to change a variable name from "In1" to "rtIn1." There are three suggestions as to how to change the variable name in this fashion.

The first change suggestion is to directly change the corresponding signal name in the model from which the generated programming code is generated as shown by element 1126. The resulting change is depicted in the code listing 1128 for the generated programming code. There are no side effects as depicted by element 1130.

The second change suggestion is to change the storage class description for the inports from "Default" to "ImportedExtern" in the model by modifying the declaration in the setting configuration settings as identified by element 1132. The result in the generated programming code is shown by element 1134. The side effects as identified in element 1036 are that the name of all root inport names are changed and there is a change from struct field names to individual variables.

The third change suggestion changes an identifier naming rule for the naming rule for field names of global type. The resulting changes to the generated programming code are depicted the 1140. The side effect 1142 is that the name of all field names of global variables change.

The results 1128, 1134, 1140 can be generated by doing partial code generation related to changes in the background. For this example, the code generator may generate the variable declaration including its name without doing the full code generation. Therefore, it can quickly provide suggestions and expected side effects right after the user modifies the variable name in the code. The suggestion may appear live or instantly to the user as the user modifies the variable name.

Figure 11C:
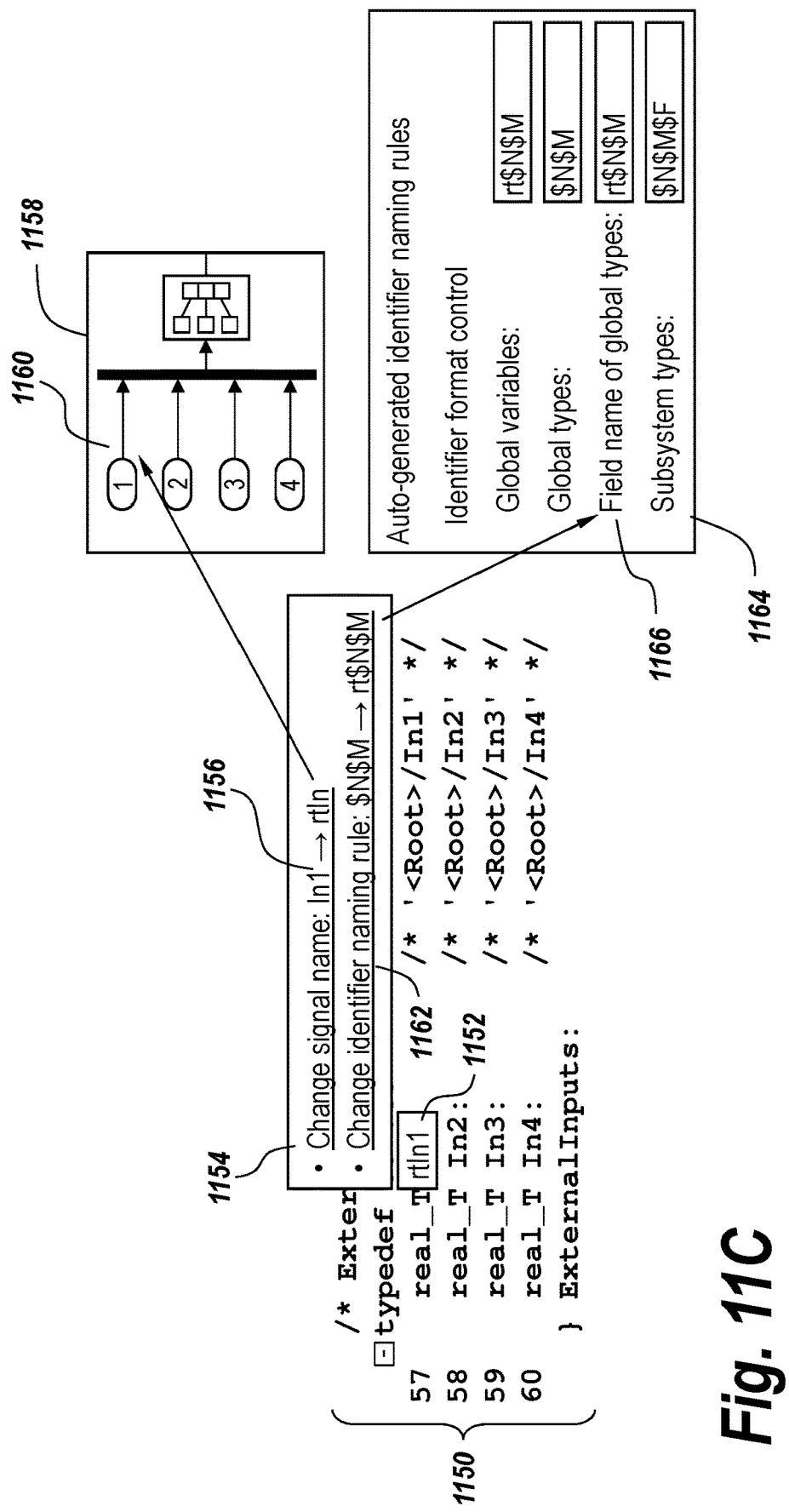
FIG. 11C shows an example in which suggestions are displayed in tool tips.

FIG. 11C shows an example of a user interface displaying change suggestions. As shown in FIG. 11C, a code listing of generated programming code 1150 includes a change to a field name 1152 from In1 to rtIn. As a result of this change, a tooltip 1154 is displayed with two change suggestions 1156 and 1162. The first suggestion 1156 is a hyperlink menu item that when selected displays the model 1160 in a user interface element 1158 to identify the suggested change in the model 1160. The second menu item 1162 is also a hyperlinked menu item that when selected prompts the display of a user interface element 1164 that identifies the naming rules and the modification to the naming rules. If the user chooses to change the naming rule, (see 1162) the naming rule edit UI 1164 can be showed with the focus on the specific rule 1166 to be modified.

Figure 12A:
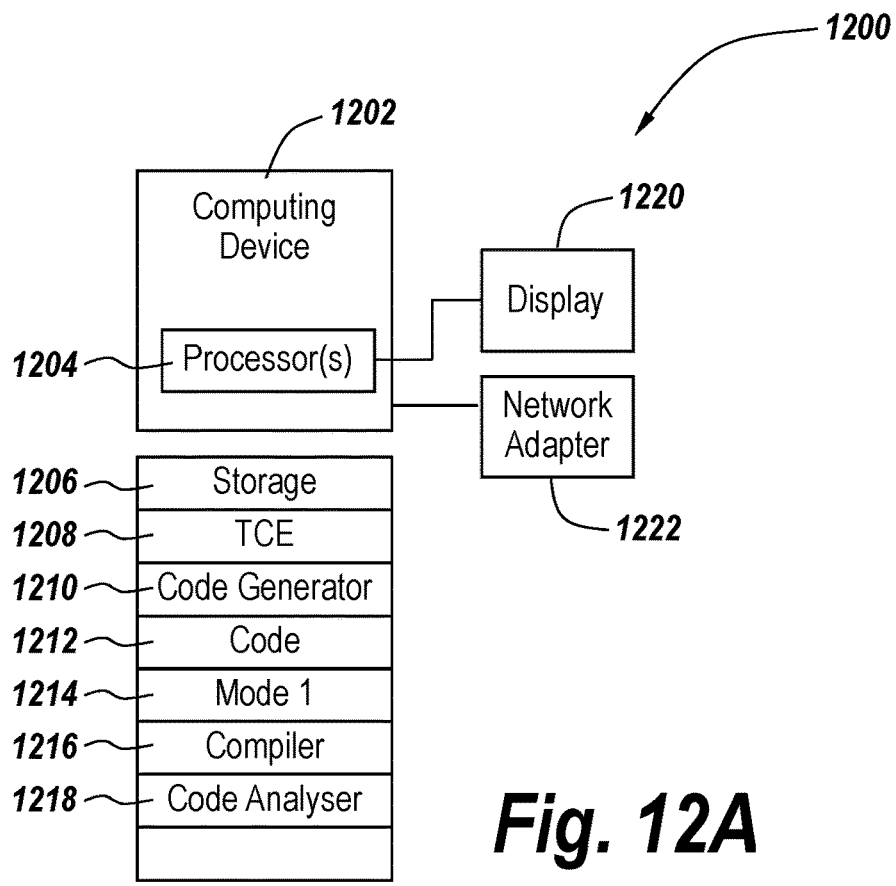
FIG. 12A illustrates a computing device suitable for practicing an exemplary embodiment.

FIG. 12A depicts a computing system 1200 that is suitable for practicing exemplary embodiments. The computing system 1200 may include a computing device 1202 with one or more processors 1204. The computing device 1202 has access to or includes a storage 1206. The storage 1206 may include a technical computing environment (TCE), such as the MATLAB technical computing environment that may also include Simulink, Stateflow, and other components. The storage 1206 may hold a code generator 1210 and may hold programming code 1212 that is generated by the code generator. The storage 1206 may hold one or more graphical models 1214. The storage may hold a compiler 1216 for compiling code and identifying compiling errors. The storage 1206 may also hold a code analyzer that may identify issues with the code, such as coding standard violations, logic errors, code proving errors, bugs and other artifacts. The programs in the storage 1206 may be executed by the processor 1204 of the computing device. The storage 1206 may include non-transitory computer readable storage media for holding computer executable instructions that may be executed by the processor 1204 of the computing device to perform the functionality of the exemplary embodiments discussed above. The storage 1206 may take a number of different forms that may include different types of storage devices including, but no limited to magnetic disc storage, optical disc storage, RAM, flash memory, read only memory (ROM), solid state storage and/or the like.

The computing device 1202 may have access to a display device 1220 for displaying information, such as user interface and elements discussed above. The computing device 1202 may have access to a network adapter 1222 that may enable the computer device to interface with networks, including local area networks and wide area networks.

Figure 12B:
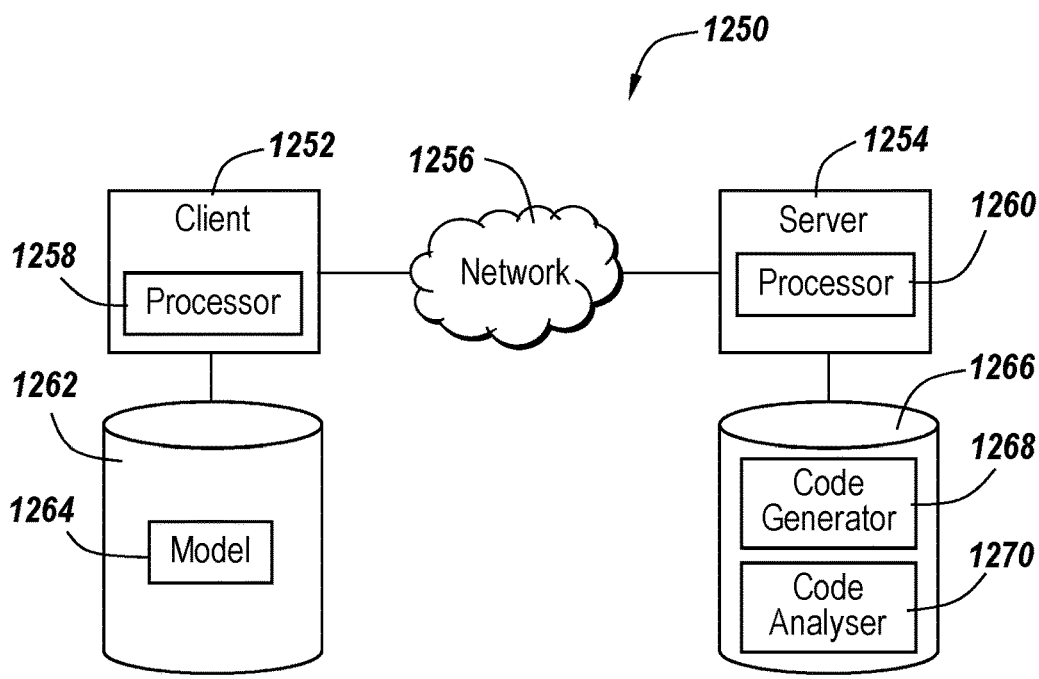
FIG. 12B illustrates a distributed environment suitable for practicing an exemplary embodiment.

It will be appreciated that the exemplary embodiments may also be practiced in a distributed environment. FIG. 12B shows an example of a suitable distributed environment 1250. The distributed environment includes a client 1252 and a server 1254 that may communicate over a network 1256, such as the Internet. The client 1252 may include one or more processors 1258. Similarly, the server may include one or more processors 1260. The client 1252 may have access to a storage 1262 that may include a graphical model. The server 1254 may include access to a storage 1266. The storage may include a code generator 1268 and a code analyzer 1270 that may be executed by the one more processors 1260 on the server 1254. In some embodiments, the client 1252 may provide the model to the server that uses the code generator 1268 to generate code that is then analyzed by the code analyzer 1270. It will be appreciated that other client server configurations and other distributed environments may be also used to practice the exemplary embodiments.

While exemplary embodiments of the present invention have been described herein, those skilled in the art will appreciate that various changes in form and detail may be made without departing from the intended scope of the present invention as defined in the appended claims.

What is claimed as new and desired to be protected by Letters Patent of the United States is:

1. A method performed by a processor of a computing device, the method comprising:
    generating code with a code generator from multiple input sources, including a graphical model and one or more configuration values set for the model, the generated code for executing the model or the generated code for simulating behavior of a real-world system, the generating comprising:
        recording information about (i) behavioral effects of the model and/or the code generator and (ii) one or more configuration effects on the generated code from (ii(a)) the model and/or the code generator and (ii(b)) the one or more configuration values,
            at least some of the behavioral effects and the one or more configuration effects being inter-dependent;
        for a portion of the generated code, determining which one of the one or more configuration effects and/or behavioral effects contributed to a feature of the portion of the generated code, the determining comprising:
            analyzing the recorded information and deriving from the behavioral effects and the one or more configuration effects an identity of the one of the one or more configuration effects and/or behavioral effects that contributed to the feature of the portion of the generated code;
        storing an association between (i) the identified one of the one or more configuration effects and/or behavioral effects that contributed to the feature of the portion of the generated code and (ii) input sources; and
        displaying on a display device a visual cue of the association based on the stored association.

2. The method of claim 1 wherein the analyzing identifies the one or more configuration effects as contributing to the feature.

3. The method of claim 2 wherein the identified one or more configuration effects result from one or more of the following configuration values:
    choice of naming rule for identifiers, choice of storage class, choice of solver type, choice of solver, choice of data to import, choice of data to export, target hardware details, code style parameters, or choice of programming language of the generated code.

4. The method of claim 2 wherein the analyzing identifies one or more of the behavioral effects as contributing to the feature.

5. The method of claim 1 wherein the analyzing identifies one or more of the behavioral effects as contributing to the feature.

6. The method of claim 5 wherein the identified one or more behavioral effects are the result of at least one of the following: a choice of an optimization in code generation, an added feature of the code generator, a patch applied to the code generator, an algorithm of the model, a modification to the model to fix an error, or a modification to the model to make the generated code compatible with a standard.

7. The method of claim 1 further comprising:
    using the stored association to identify which of the one or more configuration values, aspects of the model, and/or aspects of the code generator contributed to the feature of the portion of the generated code; and
    as part of displaying on the display, displaying visual cue or a display that indicates that the identified configuration values, aspects of the model, and/or aspects of the code generator contributed to the feature of the portion of the generated code.

8. The method of claim 7 wherein the displaying is automatically triggered by a programmatic mechanism.

9. The method of claim 7 wherein the displaying is in response to a user interface event.

10. The method of claim 1, wherein the one or more configuration values include at least one atomic configuration value.

11. The method of claim 1, wherein at least two source aspects comprising aspects of the model, aspects of the code generator and/or one or more configuration values have at least one of the following relationships relative to causing the one or more configuration effects and/or behavioral effects: a logical AND relationship, a logical OR relationship, an override relationship where one of the at least two source aspects overrides another of the at least two source aspects, or a combination relationship where the at least two source aspects each contribute to the one or more configuration effects or the behavioral effects.

12. The method of claim 1, wherein the feature is one of scope, visibility, lifetime, data type, or memory sector.

13. The method of claim 1, the method further comprising:
identifying that the generated code has been modified to have a modification, wherein the multiple input sources include the graphical model;
determining how the input sources may be modified to realize the modification through code generation by the code generator; and
displaying additional information on the display device relating to how the input sources may be modified to realize the modification through code generation by the code generator.

14. The method of claim 13, wherein the displayed additional information specifies multiple ways the input sources may be modified to realize the modification.

15. The method of claim 14, further comprising capturing information regarding relationships between the input sources and using the information regarding the relationships in the determining how the input sources may be modified.

16. The method of claim 15, wherein the displaying additional information displays how the input sources may be modified in a prioritized order based on a predetermined priority system.

17. The method of claim 16, wherein the predetermined priority system is based on at last one of a past behavior, a received preference, or a rule.

18. The method of claim 13, wherein the at least one other input source includes at least one of configuration information for the code generator or modifications that have been made to the code generator.

19. The method of claim 1, wherein the analysis identifies one of the following: violations of a coding standard, compiling errors, errors in the generated code, that a portion of the generated code cannot be proven by a code prover, or changes in the generated code relative to previously generated code generated from the graphical modes by the code generator.

20. The method of claim 1, wherein the analysis is performed by a code prover that identifies errors in the portion of the generated code.

21. The method of claim 1, wherein the analysis is static analysis.

22. The method of claim 1, wherein the analysis is dynamic analysis.

23. A non-transitory computer-readable storage medium storing instructions executable by a processor of a computing device to cause the processor to perform the following:
generate code with a code generator, from multiple input sources, including a graphical model and one or more configuration values set for the model, the generated code for executing the model or the generated code for simulation behavior of a real-world system, the generating comprising:
recording information about (i) behavioral effects of the model and/or the code generator and (ii) one or more configuration effects on the generated code from (ii(a)) the model and/or the code generator and (ii(b)) the one or more configuration values, at least some of the behavioral effects and the one or more configuration effects being inter-dependent;
for a portion of the generated code, determine which one of the one or more configuration effects and/or behavioral effects contributed to a feature of the portion of the generated code, the determining comprising:
analyzing the recorded information and deriving from the behavioral effects and the one or more configuration effects an identity of the one of the one or more configuration effects and/or behavioral effects that contributed to the feature of the portion of the generated code;
store an association between (i) the identified one of the one or more configuration effects and/or behavioral effects that contributed to the feature of the portion of the generated code and (ii) input sources; and
display on a display device visual cue of the association based on the stored association.

24. The non-transitory computer-readable storage medium of claim 23, wherein the analyzing identifies the one or more configuration effects as contributing to the feature.

25. The non-transitory computer-readable storage medium of claim 24, wherein the identified one or more configuration effects result from one or more of the following configuration values: choice of naming rule for identifiers, choice of storage class, choice of solver type, choice of solver, choice of data to import, choice of data to export, target hardware details, code style parameters, or choice of programming language of generated code.

26. The non-transitory computer-readable storage medium of claim 24, wherein the analyzing identifies one or more of the behavioral effects as contributing to the feature.

27. The non-transitory computer-readable storage medium of claim 23, wherein the analyzing identifies one or more of the behavioral effects as contributing to the feature.

28. The non-transitory computer-readable storage medium of claim 27, wherein the identified one or more behavioral effects are a result of at least one of the following: a choice of an optimization in code generation, an added feature of the code generator, a patch applied to the code generator, an algorithm of the model, a modification to the model to fix an error, or a modification to the model to make the generated code compatible with a standard.

29. The non-transitory computer-readable storage medium of claim 23, further storing instructions to cause the processor to:
use the stored association to identify which of the one or more configuration values, aspects of the model, and/or aspects of the code generator contributed to the feature of the portion of the generated code; and
display a visual cue or a display that indicates that the identified configuration values, aspects of the model, and/or aspects of the code generator contributed to the feature of the portion of the generated code.

30. The non-transitory computer-readable storage medium of claim 23, wherein the one or more configuration values include at least one atomic configuration value.

31. The non-transitory computer-readable storage medium of claim 23, wherein at least two of the source aspects, comprising (i) aspects of the model, (ii) aspects of the code generator, and/or (iii) one or more multiple configuration values, have at least one of the following relationships relative to causing the one or more configuration effects and/or behavioral effects: (a) a logical AND relationship, (b) a logical OR relationship, (c) an override relationship where one of the at least two source aspects overrides another of the source aspects, or (d) a combination relationship where the at least two source aspects each contribute to the one or more configuration effects or the behavioral effects.

32. The non-transitory computer-readable storage medium of claim 23, wherein the feature is one of scope, visibility, lifetime, data type, or memory sector.

33. The non-transitory computer readable storage medium of claim 23, further storing instructions for execution on the processor of the computing device to cause the processor to perform the following:
- identify that the generated code has been modified to have a modification, wherein the input sources include the graphical model;
- determine how the input sources may be modified to realize the modification through code generation by the code generator; and
- display additional information on the display device relating to how the sources may be modified to realize the modification through code generation by the code generator.

* * * * *